(12) United States Patent
Ando et al.

(10) Patent No.: US 7,286,746 B1
(45) Date of Patent: Oct. 23, 2007

(54) MEDIUM FOR STORING AUDIO/IMAGE INFORMATION AND MANAGEMENT SYSTEM THEREOF

(75) Inventors: Hideo Ando, Hino (JP); Masafumi Tamura, Chofu (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1445 days.

(21) Appl. No.: 09/662,217

(22) Filed: Sep. 14, 2000

(30) Foreign Application Priority Data

Sep. 29, 1999 (JP) ................................. 11-275570

(51) Int. Cl.
H04N 5/93 (2006.01)
(52) U.S. Cl. ............................ 386/52; 386/54; 386/95; 386/96
(58) Field of Classification Search .................. 386/52, 386/55, 95, 96, 94, 105, 125, 126, 54; 380/201
See application file for complete search history.

(56) References Cited

U.S. PATENT DOCUMENTS

| 5,825,876 | A | * | 10/1998 | Peterson, Jr. ................ 380/231 |
| 6,005,940 | A | * | 12/1999 | Kulinets ...................... 380/201 |
| 6,104,684 | A | | 8/2000 | Moriyama et al. |
| 6,181,870 | B1 | * | 1/2001 | Okada et al. ................. 386/95 |
| 6,289,102 | B1 | * | 9/2001 | Ueda et al. .................. 380/201 |
| 6,353,702 | B1 | | 3/2002 | Ando et al. |
| 6,389,222 | B1 | | 5/2002 | Ando et al. |
| 6,404,980 | B1 | * | 6/2002 | Yagi et al. ..................... 386/95 |
| 2002/0015580 | A1 | | 2/2002 | Ando et al. |
| 2002/0081099 | A1 | | 6/2002 | Tsumagari et al. |
| 2003/0152370 | A1 | | 8/2003 | Otomo et al. |

FOREIGN PATENT DOCUMENTS

| JP | 51-21726 | 2/1976 |
| JP | 62-234474 | 10/1987 |
| WO | WO 00/62295 | 10/2000 |

OTHER PUBLICATIONS

Hideo Ando et al., U.S. Appl. No. 09/659,583, filed Sept. 11, 2000.

* cited by examiner

*Primary Examiner*—Vincent Boccio
(74) *Attorney, Agent, or Firm*—Finnegan, Henderson, Farabow, Garrett & Dunner, L.L.P.

(57) ABSTRACT

In a memory card having editable audio information and image information recorded therein, a music unit for audio reproduction and a cell as the reproduction unit of less than the music unit are defined. In the memory card, cell information CI having a reproduction relationship between a music number and image information is recorded. In a case where audio information is reproduced in unit of music number #β including cell information CI#2 to CI#4, cell information CI#2 contains pointer information IPI#2 for specifying image information IMG_02.IOB to IMG_03.IOB to be displayed. In this manner, there is provided guideline information as to how the still image corresponding to the edited music is displayed after edit processing has been performed for recorded audio information (music).

1 Claim, 17 Drawing Sheets

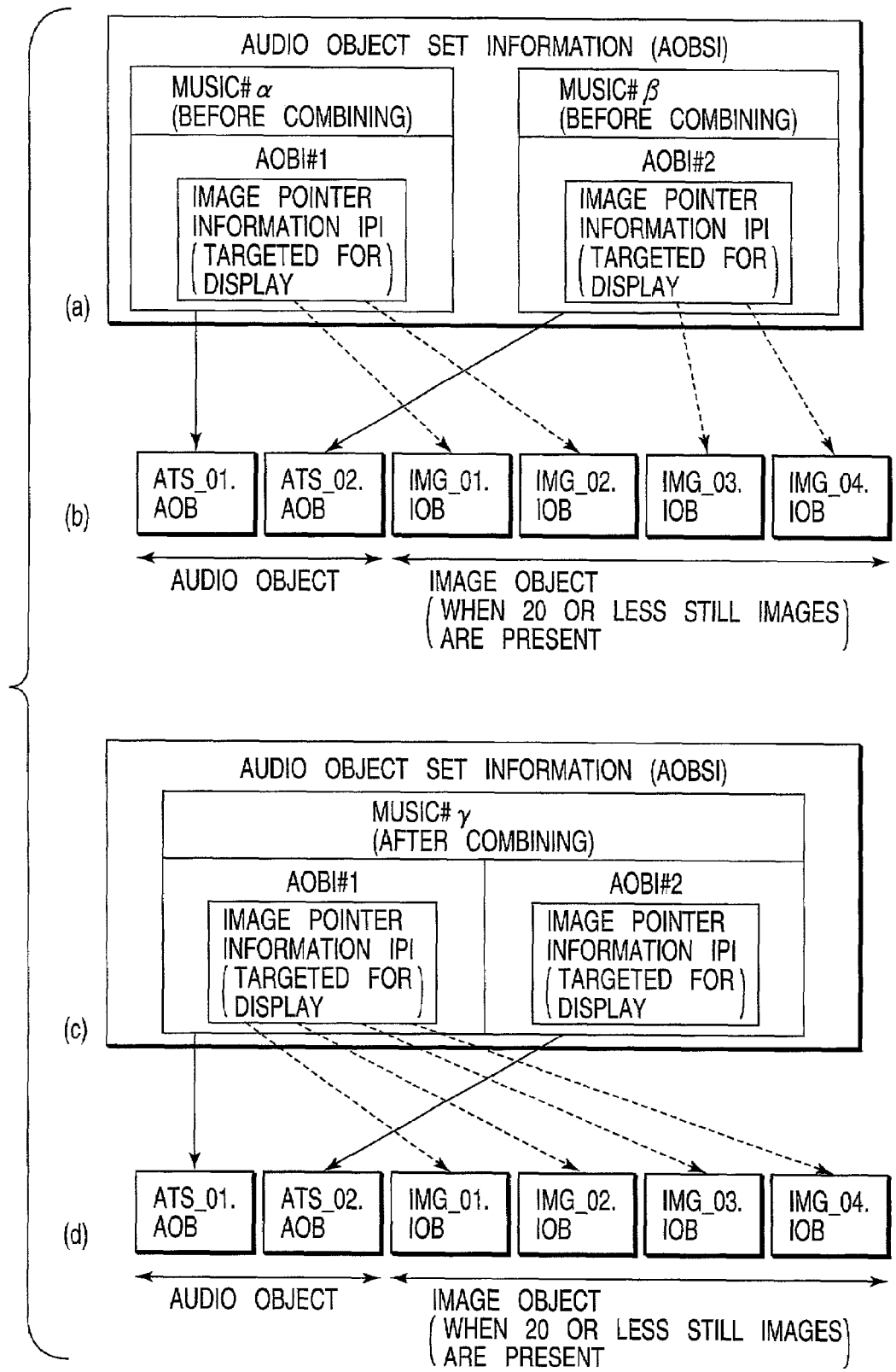
F I G. 1

FIG. 3

(a) AUDIO CARD (MEMORY CARD) 100 WITH COPY PROTECT FUNCTION

| CARD INTERNAL CONTROL CPU/MPU 101 | ROM 102 FOR RECORDING CONTROL PROGRAMS RELATED TO AUTHENTICATION/KEY EXCHANGE & I/O PROCESSING | CARD SPECIFIC ID & KEY INFORMATION RECORDING REGION (RAM) 103 | APPLICATION DATA RECORDING REGION (RAM) 104 |

(b)

| BOOT INFORMATION REGION 110 | FILE ALLOCATION TABLE (FAT) RECORDING REGION 111 | ROOT DIRECTORY INTERNAL INFORMATION RECORDING REGION 112 | DATA REGION 113 |

(c)

| GENERAL COMPUTER INFORMATION RECORDING REGION 120 | AUDIO RELATED INFORMATION RECORDING REGION 121 | GENERAL COMPUTER INFORMATION RECORDING REGION 120 |

(d)

| MANAGEMENT INFORMATION RECORDING REGION 130 | AUDIO OBJECT (AOB) RECORDING REGION 131 | IMAGE OBJECT (IOB) RECORDING REGION 132 | TEXT OBJECT (TOB) RECORDING REGION 133 |

(e)

| PGC SET INFORMATION (PGCSI) RECORDING REGION 140 | AOB SET INFORMATION (AOBSI) RECORDING REGION 141 | IOB SET INFORMATION (IOBSI) RECORDING REGION 142 | TOB SET INFORMATION (TOBSI) RECORDING REGION 143 |

PGC=PROGRAM CHAIN (f)

| ORIGINAL PGC (ORG_PGC) INFORMATION RECORDING REGION 150 | USER DEFINED PGC (UD_PGC) #A RECORDING REGION 151 | UD_PGC #B RECORDING REGION 152 | ---------- |

(g)

| REGION 160 FOR RECORDING INFORMATION OF TOTAL NUMBER OF CELLS EXISTING IN PGC | CELL INFORMATION (CI) #1 RECODING REGION 161 | CI#2 RECORDING REGION 162 | ---------- |

```
                    START
                      │
┌─────────────────────────────────────────────────┐
│ MAINTAIN MANAGEMENT UNITS (C#α/AOB#α/TK#α AND   │
│ C#β/AOB#β/TK#β) CONCERNING MUSIC #α AND MUSIC   │
│ #β BEFORE COMBINING AND MANAGEMENT INFORMATION  │
│ (CI#α/AOBI#α/TKI#α AND CI#β/AOBI#β/TKI#β) BASED │
│ ON RESPECTIVE MANAGEMENT UNITS. THEN, CHANGE    │
│ INSIDE OF MANAGEMENT INFORMATION                │
│ (CI#/AOBI#/TKI#) IN CORRESPONDENCE WITH         │
│ COMBINED MUSIC #γ (α+β→γ; MUSIC #α PROCEEDS     │
│ WHEN COMBINED MUSIC #γ IS REPRODUCED, AND       │
│ MUSIC #β IS REPRODUCED AFTERWARD) <ST300>       │
└─────────────────────────────────────────────────┘
                      │
┌─────────────────────────────────────────────────┐
│ IF IOB/IMG (STILL IMAGE) SPECIFIED BY #α AND    │
│ #β EXCEEDS PREDETERMINED NUMBER (FOR EXAMPLE,   │
│ 20), MOVE SPECIFYING INFORMATION (IMAGE POINTER │
│ INFORMATION IPI) CONCERNING IOB/IMG OF #β TO    │
│ MANAGEMENT INFORMATION (CI#α/AOBI#α/TKI#α)      │
│ CONCERNING #α <ST302>                           │
└─────────────────────────────────────────────────┘
                      │
┌─────────────────────────────────────────────────┐
│ IF IOB/IMG (FOR EXAMPLE, 25) SPECIFIED BY #α    │
│ AND #β EXCEEDS PREDETERMINED NUMBER,            │
│ AUTOMATICALLY SELECT PREDETERMINED NUMBER (UP   │
│ TO 20) FROM AMONG IOB/IMG SPECIFIED BY #α AND   │
│ #β. THEN, REWRITE SPECIFYING INFORMATION (IMAGE │
│ POINTER INFORMATION IPI) CONCERNING SELECTED    │
│ IOB/IMG INTO MANAGEMENT INFORMATION             │
│ (CI#α/AOBI#α/TKI#α) CONCERNING #α, AND REWRITE  │
│ SPECIFYING INFORMATION CONCERNING DESELECTED    │
│ "REJECTED IOB"/"REJECTED IMG" INTO MANAGEMENT   │
│ INFORMATION (CI#β/AOBI#β/TKI#β) CONCERNING      │
│ #β <ST304>                                      │
└─────────────────────────────────────────────────┘
                      │
┌─────────────────────────────────────────────────┐
│ IF COMBINED MUSIC #γ IS REPRODUCED, DISPLAY     │
│ IOB/IMG SPECIFIED IN MANAGEMENT INFORMATION     │
│ (CI#α/AOBI#α/TKI#α) CONCERNING #α AT THE SAME   │
│ TIME AS REPRODUCTION OF MUSIC #γ <ST306>        │
└─────────────────────────────────────────────────┘
                      │
┌─────────────────────────────────────────────────┐
│ TO DISPLAY REJECTED IOB/REJECTED IMG DESELECTED │
│ FROM TERGET OF DISPLAY WHEN COMBINED MUSIC #γ   │
│ IS REPRODUCED, SET INFORMATION STORAGE MEDIUM   │
│ (MEMORY CARD WITH ID OR RECORDING/REPRODUCING   │
│ ENABLE DISC) IN DEVICE HAVING ADVANCED EDIT     │
│ FUNCTION. USING THIS ADVANCED EDIT FUNCTION,    │
│ EXCHANGE MANAGEMENT INFORMATION                 │
│ (CI#α/AOBI#α/TKI#α AND CI#β/AOBI#β/TKI#β)       │
│ CONCERNING #α AND #β, AND EXCHANGE SPECIFYING   │
│ INFORMATION (IMAGE POINTER INFORMATION IPI)     │
│ CONCERNING IOB/IMG IN RECORDING REGION <ST308>  │
└─────────────────────────────────────────────────┘
                      │
                    END
```

FIG. 13

MEDIUM FOR STORING AUDIO/IMAGE INFORMATION AND MANAGEMENT SYSTEM THEREOF

CROSS-REFERENCE TO RELATED APPLICATIONS

This application is based upon and claims the benefit of priority from the prior Japanese Patent Application No. 11-275570, filed Sep. 29, 1999, the entire contents of which are incorporated herein by reference.

BACKGROUND OF THE INVENTION

The present invention relates to an improvement of an information storage medium capable of recording and/or reproducing memory card, disc (phase changed optical disc, magneto-optical disc, or magnetic disc, etc.) or the like.

In particular, the present invention relates to an improvement of a removable and portable information storage medium suitable for recording and/or reproducing digital image information in combination with digital audio information.

In addition, the present invention relates to a method for reproducing information recorded in the information storage medium.

Further, the present invention relates to a method for editing information recorded in the information storage medium.

As a removable and portable information storage medium for recording digital audio information, there exists:

(A) CD-DA (compact disc having digital audio recorded in a pit shape);

(B) CD-I (CD interactive) or video CD;

(C) DVD (digital versatile disc) video or DVD audio disc (phase changed recording);

(D) MD (disc utilizing magneto-optical recording); and (E) solid audio (semiconductor memory card such as flash memory) or the like.

With respect to the shape of information storage medium, the above (A) to (D) has a disc shape. In these information storage mediums, convergent laser beam(s) is (are) emitted to a recording layer on a medium while the medium is being rotated, and a change in the reflection light is detected as a reproduction signal.

In contrast, the above (E) may have any size and/or shape, but roughly has a card shape. In the (E), digital audio information is recorded in a semiconductor memory (mainly flash memory) incorporated in the card shaped body so that audio information is recorded and/or reproduced via electrode terminals provided at a predetermined portion of the card surface.

The CD-DA in the above (A) is used exclusively for reproduction or playback. A user cannot add new audio information, and cannot edit audio information already recorded on an information storage medium. Further, this CD-DA has a format which does not support recording of still image information on the information storage medium.

In contrast, each of the CD-I or video CD of the above (B) and the DVD video or DVD audio of the above (C) has a format which enables to reproduce audio information, and at the same time, to display still image. However, since both of them are exclusive for reproduction only, it is impossible not only to add new audio information by a user, but also to edit the audio information already recorded on the information storage medium.

On the other hand, in MD of the above (D), new audio information can be recorded in the information storage medium by the user, and edit processings such as "combining music (Combine)", "dividing music (Divide)", and "Moving music (Move)" can also be performed.

However, MD does not have such a format that a still image can be displayed simultaneously during audio information reproduction.

Apart from package media of the above (A) to (C), in recent years, there becomes popular a system in which digital audio information compressed by MP3 (MPEG audio layer 3) or AAC (MPEG audio advanced audio coding) is distributed on the Internet, the compressed audio information is recorded in a memory card (mainly flash memory) of the above (E) on a receiving party, and the recorded memory card is reproduced while the user is carrying it.

In this case, the user can record new audio information in the memory card, and can edit recorded audio information. However, in this case as well, at present, it does not have such a format that a still image according to audio information can be recorded or edited.

As in CD-I, video CD or DVD audio, the market strongly desires introduction to an audio system capable of reproducing audio information, and at the same time, displaying still image information, and further, capable of recording or editing new audio information by a user.

In addition, in this system, edit functions of a grade such as "Combining music" or "Dividing music" are required.

However, after "Combining must" or "Dividing music" has been performed, in the case where audio information is reproduced in units of music, it is very difficult to determine a method for selecting still image information to be displayed simultaneously and a timing of displaying each item of the still image information.

For example, assume a case wherein music number #α and music number #β having the same reproduction time periods have been recorded, 20 still images are displayed during reproduction of music number #α while these images are changed within a short period of time, and only one still image is continuously displayed during reproduction of music number #β.

In the case where music number #α and music number #β are combined by editing to make music number #γ if the first 20 still images are displayed to be changed within a short period of time during reproduction of music number #γ, and only the last one image is continuously displayed for a long period of time, the user feel strange.

In addition, in the case where music number #θ is divided into music number #ι and music number #κ, there is a problem with how to set still images displayed in music number #ι and music number #κ, respectively.

There does not exist, including the aforementioned MD (by which editing after recording is possible), any format (or specification) which explicitly indicates the guidelines for an optimal method of displaying still images (or still pictures) after edit processing such as "Combining music" or "Dividing music" has been performed.

BRIEF SUMMARY OF THE INVENTION

This invention has been made in view of the foregoing circumstance, and has its primary object to provide an information storage medium capable of having information (image pointer information) on which guidelines are imparted as to how to display still images (or still pictures) after edit processing such as "Combine" or "Divide" has been performed for the recorded audio information (music).

A second object of the present invention is to provide a method for reproducing information recorded on the above information storage medium.

A third object of the present invention is to provide a method for editing information recorded on the above information storage medium.

In order to achieve the foregoing first object, in an information storage medium having a recording region for audio information and image information, there is defined a first reproduction unit (music) for reproducing the audio information (AOB) and a second reproduction unit (C/AOB/IOB/TK) having fineness equal to or less than the first reproduction unit (music).

The first reproduction unit (music) is composed of one or more second reproduction units (C/AOB/IOB/TK). In this information storage medium, there is recorded management information (CI/AOBI/IOBI/TKI) concerning the second reproduction unit (C/AOB/IOB/TK).

In the management information (CI/AOBI/IOBI/TKI), a reproduction relationship between the audio information (AOB) and the image information (IOB) is described.

At least one item of the management information (CI/AOBI/IOBI/TKI), on which a reproduction relationship between the audio information (AOB) and the image information (IOB) is described, includes information (IPI#) for specifying image information to be displayed when the audio information is reproduced in the first reproduction unit (music) which includes the second reproduction unit (C/AOB/IOB/TK).

The information storage medium according to the present invention can have a region for storing identification information (ID) specific to individual information storage mediums.

The information storage medium according to the present invention can also have a region for storing information (key) required for decoding (decrypting) the encoded (encrypted) information in the case where information to be recorded is encoded (encrypted).

The information storage medium according to the present invention can have a region in which described is a process (ST10) of mutual authentication between the medium and an apparatus for recording information in or reproducing information from the medium.

The audio information (AOB) recorded in the information storage medium according to the present invention can include a predetermined header and digital audio information compressed by a predetermined method (such as MPEG2/AAC). This predetermined header is stored in a region not encrypted, and the compressed digital audio information is stored in an encrypted region in predetermined encrypting units.

Further, the information storage medium according to the present invention can have a recording region for audio information (AOB) and text information (TOB).

Here, a first reproduction unit (music) for reproducing the audio information (AOB) and a second reproduction unit (C/AOB/TOB/TK) having fineness equal to or less than the first reproduction unit (music) are defined.

The first reproduction unit (music) is composed of one or more second reproduction units (C/AOB/TOB/TK).

In this information storage medium, there is recorded management information (CI/AOBI/TOBI/TKI) concerning the second reproduction unit (C/AOB/TOB/TK).

In the management information (CI/AOBI/TOBI/TKI), a reproduction relationship between the audio information (AOB) and the text information (TOB) is described.

At least one item of the management information (CI/AOBI/TOBI/TKI), on which a reproduction relationship between the audio information (AOB) and the text information (TOB) is described, includes information (TPI#) for specifying text information to be displayed when the audio information is reproduced in the first reproduction unit (music) which includes the second reproduction unit (C/AOB/TOB/TK).

In order to achieve the second object, in a method for reproducing an information storage medium having a recording region for audio information and image information, there is employed an information storage medium having a recording region for audio information (AOB) and image information (IOB).

The storage medium comprises a first reproduction unit (music) for reproducing the audio information (AOB) and a second reproduction unit (C/AOB/TK) having fineness equal to or less than the first reproduction unit (music).

The first reproduction unit (music) is composed of one or more of the second reproduction units (C/AOB/TK).

Management information (CI/AOBI/TKI) concerning the second reproduction unit (C/AOB/TK) is recorded in the medium.

A reproduction relationship between the audio information (AOB) and the image information (IOB) is described in the management information (CI/AOBI/TKI).

When audio information (AOB) is reproduced in the first reproduction unit from the medium, image information (IOB) to be displayed is determined by utilizing the management information (CI/AOBI/TKI).

In addition, image information to be displayed when audio information is reproduced in the first reproduction unit (music) is determined by utilizing information (IPI#) recorded in management information (AOBI#) which relates to the second reproduction unit reproduced first in the first reproduction unit (music).

In order to achieve the third object, in a method for editing an information storage medium having a recording region for audio information and image information, there is employed an information storage medium.

In the medium, audio information (AOB) and still image information (IOB) are recorded, and management information (AOBI) indicative of a reproduction relationship between the audio information (AOB) and the still image information (IOB) is also recorded.

The recorded contents include a first reproduction unit (music) for reproducing the audio information (AOB) and first audio information.

The recorded contents further include first management information (AOBI#) for specifying still image information reproduced simultaneously when the first audio information is reproduced in the first reproduction unit (music); and second management information (AOBI#) for specifying still image information reproduced simultaneously when second audio information, different from the first audio information, is reproduced in the first reproduction unit (music).

By employing the information storage medium, the first audio information and the second audio information can be combined to produce third audio information which forms a new first reproduction unit (music).

Then, third management information corresponding to the third audio information can be recorded on the information storage medium (ST300).

Further, in still image information specified in the third management information, it is possible to include all (ST302) or at least part (ST304) of the still image information specified in the first management information (AOBI#), and all (ST302) or at least part (ST304) of the still image information specified in the second management information (AOBI#).

In addition, in the third audio information, when the first audio information is reproduced earlier than the second audio information, the recording place of the third management information can be utilized compatible with the recording place of the first management information.

If a summation of the still image information specified in the first management information (AOBI#) and the still image information specified in the second management information (AOBI#) exceeds a predetermined value (ST304), the total number of still image information specified in the third management information is reduced to the predetermined value.

Thereafter, the information (IPI) for specifying the reduced still image information is recorded at a portion corresponding to the first management information (AOBI#) in the third management information (AOBI#).

Then, the information (IPI) for specifying still image information (rejected image(s)) other than still image information specified in the third management information (AOBI#) is recorded at a portion corresponding to the second management information (AOBI#) in the third management information (AOBI#).

Further, in order to achieve the third object, in a method for editing an information storage medium having a recording region for audio information and image information, there is employed an information storage medium in which audio information (AOB) and still image information (IOB) are recorded, and first management information (AOBI#) indicative of a reproduction relationship between the audio information (AOB) and the still image information (IOB) is also recorded.

The recorded contents include a first reproduction unit (music) for reproducing first audio information (AOB).

The recorded contents further include first management information (AOBI#) in which recorded is specifying information (IPI#) for specifying still image information reproduced simultaneously when the first audio information is reproduced in the first reproduction unit (music).

In this medium, the first audio information is divided into second audio information reproduced in the first reproduction unit (music) and third audio information reproduced in the first reproduction unit (music) (ST400).

In addition, second management information (AOBI#) corresponding to the second audio information and third management information (AOBI#) corresponding to the third audio information are set (ST400).

The specifying information (IPI#) recorded in the first management information (AOBI#) is recorded in the second management information (AOBI#) and the third management information (AOBI#) (ST402).

The image information (image object IOB) is generally composed of one or more mutually independent still images (still pictures) whose contents are different from each other. However, when a still image (such as JPEG compressed image or I-picture portion of MPEG compressed image) is recorded in a medium, the recording mode for the medium is not always limited to a concept of still image in consideration of a stage at which such image is displayed.

For example, let us consider a case wherein a computer graphic (CG) image of 8 bit plain, capable of performing color display using a 256 color palette, is included in image object IOB. In this case, when the 256 color palette used for the CG image display is sequentially changed with an elapse of time (or when the color palette is cycled), even if original data is a still picture, part of the display screen (a portion at which color cycling is performed) is seen as if it were moving.

Alternatively, for example, let us consider another case wherein 15 continuous images (each of which is a still picture) are recorded in a medium, these recorded images are fetched to a video memory, and the fetched images are then continuously reproduced. In this case, when 15 continuous images are repeatedly reproduced with a rate of 5 images per second, for example, these images are seen as if they were slow motion images of 5 frames/second, looped at intervals of three seconds.

That is, in a broad sense including a visual point of view when a user actually sees an image(s), the above image information (image object IOB) is not limited to a fixed still image or still picture.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view illustrating a case wherein a plurality of music numbers are recorded in an information storage medium (memory card or disc) according to an embodiment of the present invention, and the music numbers with still images (or still pictures) whose total is equal to or less than a predetermined number (in this case, 20) are combined by editing;

FIG. 3 is a view illustrating a recording format of a memory card that is an information storage medium according to an embodiment of the present invention;

FIG. 13 is a flow chart illustrating the edit processing when two music numbers of audio information with image information recorded in the audio card shown in FIG. 3 (or optical disc shown in FIG. 4) are combined with each other;

DETAILED DESCRIPTION OF THE INVENTION

Figure 2:
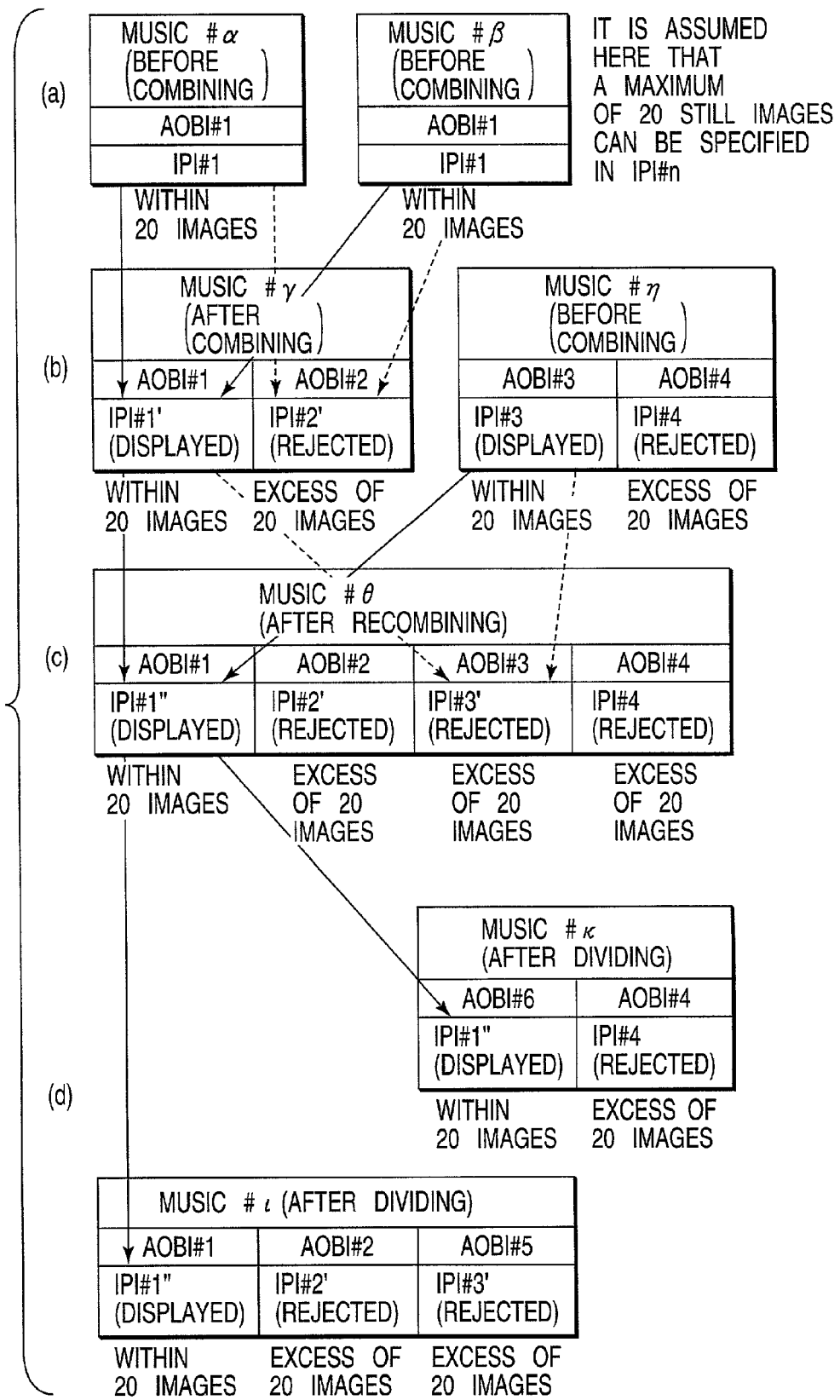
FIG. 2 is a view illustrating a case wherein a plurality of music numbers are recorded in the information storage medium (memory card or disc) according to an embodiment of the present invention, and the music numbers having still images whose total exceeds a predetermined number (in this case, 20) are combined by editing; and a case wherein these plurality of music numbers are divided after such combining.

Hereinafter, preferred embodiments of the present invention will be described with reference to the accompanying drawings.

FIG. 1 is a view illustrating a case in which a plurality of music numbers with still images (or still pictures) whose total is equal to or less than a predetermined number (in this case, 20) are combined with each other by editing.

As shown in (a) of FIG. 1, music number #α and music number #β are initially managed separately by audio object information AOBI#1 and AOBI#2. These AOBI#1 and AOBI#2 have image pointer information IPI respectively, and are collected in audio object set information AOBSI.

As shown in (a) and (b) of FIG. 1, an audio information file (audio object ATS_01.AOB) containing the contents of music number #α is specified by AOBI#1. A still image file (image object IMG_01.IOB to IMG_02.IOB) displayed when this music number #α is reproduced is specified by image pointer information IPI of AOBI#1.

In addition, as shown in (a) and (b) of FIG. 1, an audio information file (audio object ATS_02.AOB) containing the contents of music number #β is specified by AOBI#2. A still image file (image object IMG_02.IOB to IMG_04.IOB) displayed when this music number #β is reproduced is specified by image pointer information IPI of AOBI#2.

The capacity of the information storage medium storing the audio object (ATS_xx.AOB) and image object (IMG_yy.IOB) shown in (b) of FIG. 1 (or the capacity of image buffer of an apparatus for reproducing the medium) is limited, and thus, an upper limit is provided for the number of still images that can be displayed per music number. This upper limit is, for example, set within the range of about 5 to 100 images according to the storage capacity of the medium (or the image buffer capacity on the reproduction apparatus). Hereinafter, assume that a maximum of 20 still images per music number can be displayed by the reproduction apparatus.

Further, an example shown in FIG. 1 assumes a case in which a total number of still images of music number #α and still images of music number #β is equal to or less than 20.

Here, let us consider a case in which a user has issued an instruction for combining music number #α and music number #β to form one music number #γ (namely, the user has performed Combine Edit processing).

In this case, two audio information files (ATS_01.AOB and ATS_02.AOB) is not changed, and only management information (AOBI#1 and AOBI#2) are rewritten.

More specifically, among from the information on a program chain (original PGC) indicative of the flow or sequence of an original audio program, the information corresponding to the image pointer information IPI of AOBI#1 and AOBI#2 is partially rewritten, and the rewritten information (IPI) is redefined as part of music number #γ.

The written information (IPI) corresponds to IPI# in AOBI# shown in (c) of FIG. 6 or IPI# in cell information CI# shown in FIG. 7 as described later.

When music number #α with still images and music number #β with still images each having a configuration shown in (a) and (b) of FIG. 1 are combined, music number #γ with still images as shown in (c) of FIG. 1 is produced.

In this case, as shown in (c) and (d) of FIG. 1, ATS_01.AOB is specified by AOBI#1 included in combined music number #γ, and ATS_02.AOB is specified by AOBI#2 included in combined music number #γ. Further, all image objects (IMG_01.IOB to IMG_04.IOB) are specified only by image pointer information IPI of AOBI#1 contained in music number #γ.

That is, when "Combining music" has been performed, the content specified by image pointer information IPI in AOBI#1 before combining and the content specified by image pointer information IPI in AOBI#2 before combining are collectively recorded in image pointer information IPI of the management information (AOBI#1) corresponding to the audio information file (ATS_01.AOB) to be reproduced first in music number #γ.

Here, image pointer information IPI of AOBI#2 contained in music number #γ is not used to specify an image object (IMG_01.IOB to IMG_04.IOB).

In other words, all image objects (IMG_01.IOB to IMG_04.IOB) can be specified by image pointer information IPI of AOBI#1 corresponding to a portion (ATS_01.AOB) to be reproduced first during reproduction of combined music number #γ. This is one of the primary features according to the present embodiment shown in FIG. 1.

According to the above feature, when combined music number #γ is reproduced, it is unnecessary to temporarily store management information (IPI) of AOBI#2 shown in (c) of FIG. 1 in a memory section (RAM) of system control section 3020 of the apparatus shown in FIG. 9 described later.

While memory saving can be thus ensured, only management information of AOBI#1 in (c) of FIG. 1 may be temporarily stored in the memory section (RAM) of system control section 3020. Then, from the stored contents of the memory section (RAM), the user can know all of the still image file names of which still image(s) can be displayed during reproduction of music number #γ. Further, the user can know the timing of changing each still image file (or can know what is the number of audio frame to change a still image during reproduction).

Figure 9:
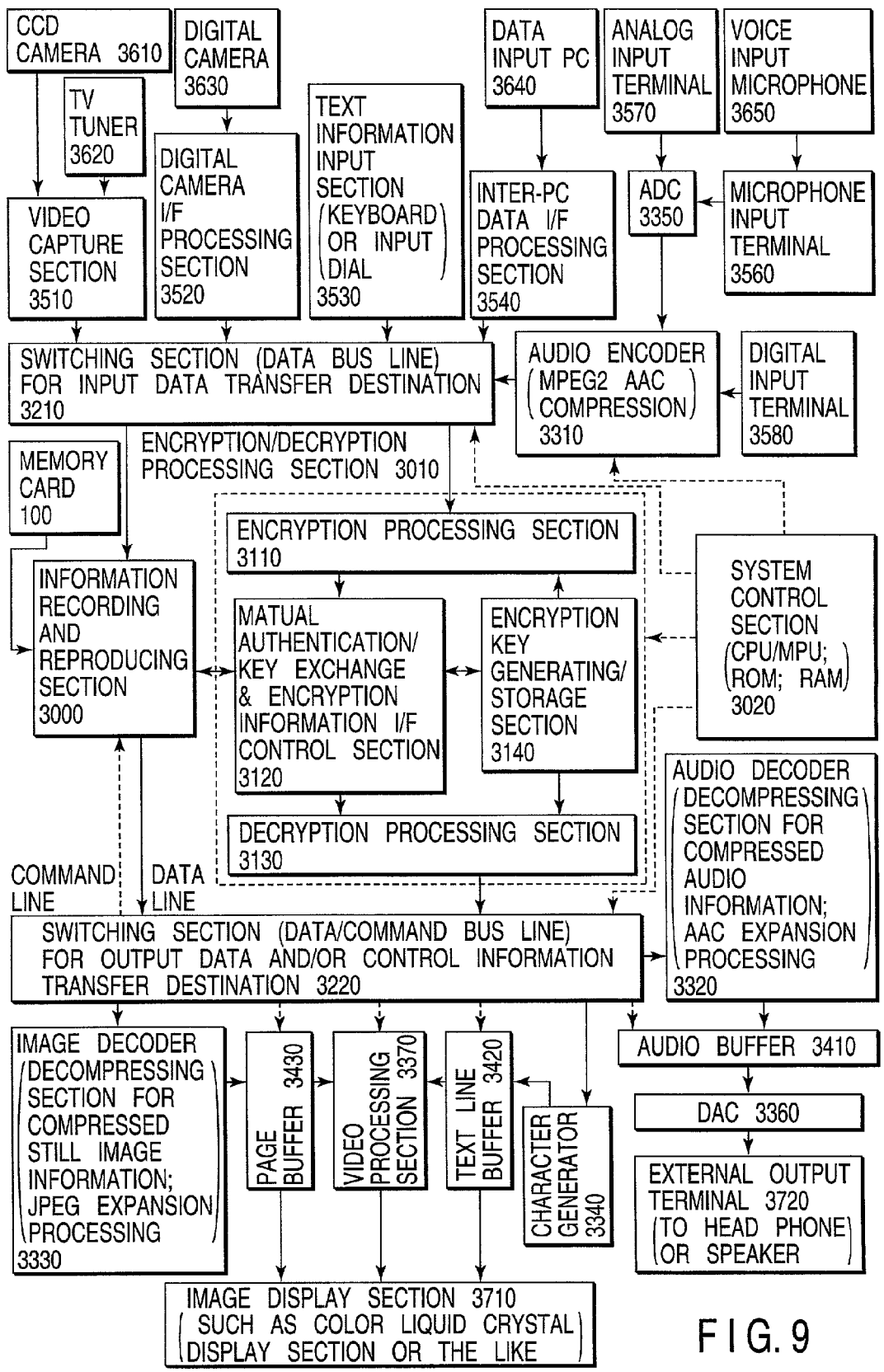
FIG. 9 is a block diagram illustrating an exemplary configuration of an apparatus for recording/reproducing information in/from the audio card with the copy protect function shown in FIG. 3.

As a result, the required memory size of RAM in system control section 3020 shown in FIG. 9 can be reduced, and accordingly, the equipment manufacturing cost can be reduced.

FIG. 2 is a view illustrating a case in which a plurality of music numbers with still images whose total number exceeds a predetermined number (in this case, 20) are combined by edition, and a case in which these music numbers are divided after such combining.

In the case where 11 to 20 still image files are set by AOBI#1 and AOBI#2 shown in (a) of FIG. 1, respectively, a total number of still images after "Combining music" has been performed exceeds the upper limit (20) per music number. The processing method in this case will be described with reference to FIG. 2.

After combining a plurality of music numbers (#α and #β shown in (a) of FIG. 2), if a total number of still images for the combined music number (#γ shown in (b) of FIG. 2) exceeds the number (20) of displayable still images per music number, system control section 3020 shown in FIG. 9 described later properly mixes (or shuffles) information items recorded in image pointer information IPI#1 and image pointer information IPI#2 shown in (a) of FIG. 2 (or mixes/shuffles image pointers obtained after removing a duplicate specified portion(s) for the same still image).

Next, 20 image pointers for 20 or more mixed still images are sequentially selected from the top, and a maximum of 20 displayable still images per combined music number (#γ) are selected.

Then, as shown in (c) of FIG. 2, the selected 20 still images are recorded in image pointer information IPI#1' of AOBI#1 of combined music number #γ. Further, upon removing the duplicate specified portion(s) of the still images for the same still image, the deselected still images (excess of 20 images) are recorded in image pointer information IPI#2' of AOBI#2 reproduced later in the same music number #γ.

By doing this, the still images to be displayed when music number #γ is reproduced after music number #α and music number #β have been combined are limited only to (20 pieces of) still images specified in image pointer information IPI#1' which is provided in management information (AOBI#1) concerning the audio information file to be reproduced first in music number #γ.

Here, if the user is not satisfied with a still image(s) selected by system control section 3020 shown in FIG. 9 during combining process of music number #γ, information exchange between image pointer information IPI#1' and image pointer information IPI#2' may be done, using still image specifying information (image pointer) being deselected (namely, rejected) and recorded in image pointer information IPI#2'.

Such information exchange between image pointer information and IPI#1' and IPI#2' can be performed by an information recording/reproducing apparatus having advanced editing functions (or an advanced editor machine), or by a personal computer (PC) in which a required application program(s) is/are installed.

Similarly, in a case where music number #γ with 20 or less display images (IPI#1') and more than 20 "rejected" image (IPI#2') is combined with music number #η with 20 or less display images (IPI#3) and more than 20 "rejected" images (IPI#4), if a total number of still images targeted for display exceeds a predetermined value (20), then 20 display images (IPI#1") of combined music number #θ are selected after shuffling the information items on image pointer information IPI#1' and on image pointer information IPI#3. The information (image pointer) indicative of the other "rejected" images is recorded in image pointer information IPI#2', IPI#3', and IPI#4 of AOBI#2, AOBI#3, and AOBI#4, respectively.

At this time, no change is made for the information (image pointer) in image pointer information IPI#2' and IPI#4. This is because the still images specified in image pointer information IPI#2' and IPI#4 are respectively associated with the contents of audio information files managed by AOBI#2 and AOBI#4.

AS shown in (b) and (c) of FIG. 2, when music number #γ and music number #η are combined with each other to obtain music number #θ, and if the information item(s) (or image pointer(s) of the rejected image(s)) in image pointer information IPI#2' and IPI#4 is (are) kept unchanged, then, in the future, the user can select still image(s) which is (are) well matched with future-divided audio information (contents of the future-divided music), provided that after music number #θ is divided in the future, re-editing is performed by the aforementioned editor with advanced function or personal computer (PC).

If the above re-editing is not done, the "rejected" image(s) specified by image pointer information IPI#2', IPI#3' and IPI#4 shown in (c) of FIG. 2 is (are) not displayed when music number #θ is reproduced or when a music number (#ι or #κ shown in (d) of FIG. 2) obtained by dividing music number #θ is reproduced.

Now, a processing method when music number #θ is divided into two sections will be described.

Let us consider a case wherein music number #θ is divided into music number #ι and music number #κ in the middle of AOBI#3 shown in (c) of FIG. 2, for example.

In this case, the audio information file corresponding to AOBI#3 is divided into two sections. Then, AOB#5 ((d) of FIG. 2) corresponding to the audio information file to be lastly reproduced in divided music number #ι is created from the management information of AOB#3 not divided. The still image information displayed while divided music number #ι is reproduced is specified by image pointer information IPI#1" ((d) of FIG. 2) in AOBI#1 corresponding to the first reproduced audio information file in music number #ι.

At this time, AOBI#1 shown in (d) of FIG. 2 has the same image pointer information IPI#1" as AOBI#1 shown in (c) of FIG. 2. That is, the information on image pointer information IPI#1" shown in (c) of FIG. 2 before division is inherited intact to AOBI#1 shown in (d) FIG. 2.

Similarly, AOBI#6 ((c) of FIG. 2) corresponding to the first reproduced audio information file in divided music number #κ is created from the management information on AOBI#3 not divided. The still image information displayed during reproduction of music number #κ is specified by image pointer information IPI#1" ((d) of FIG. 2) in AOBI#6.

At this time, AOBI#6 shown in (d) of FIG. 2 has the same image pointer information IPI#1" as AOBI#1 shown in (c) of FIG. 2. That is, the information on image pointer information IPI#1" shown in (c) of FIG. 2 before division is inherited intact to AOBI#6 shown in (d) of FIG. 2.

The number of display images for music number #θ not divided is originally limited to 20. Therefore, even if image pointer information IPI#1" having the information (image pointer) indicative of 20 images is copied to divided music number #ι and music number #κ, no problem will occur with respect to the number of still images to be displayed.

There is a possibility that image pointer information IPI#1" copied for still image display during reproduction of music number #κ fails to include the contents being matched with AOBI#6. In this case, the user may perform re-editing using the aforementioned editor with advanced function or personal computer PC, whereby the content (image pointer) of image pointer information IPI#1" can be changed to match with the content (audio information specified by AOBI#6) of divided music number #κ.

Incidentally, a method for combining and/or dividing music number(s) described with reference to FIGS. 1 and 2 is a processing method that conforms to the data structure shown in FIG. 6 described later. The combining and/or dividing processing shown in FIGS. 1 and 2 can also be performed in conformance with the data structure shown in FIG. 7 described later. However, when the music combining and/or dividing processing is performed in conformance with the data structure shown in FIG. 7, it should be noted that image pointer information IPI is recorded in cell information CI rather than audio object information AOBI.

FIG. 3 is a view illustrating a data structure (recording format) of information recorded in audio card (memory card) 100 that is an information storage medium according to one embodiment of the present invention.

The information storage medium (audio card or memory card) shown in FIG. 3 is card shaped in size equal to name card, planer gum or stamp. Electrodes (not shown in FIG. 3) for connection with an external device (not shown in FIG. 3) are provided at a predetermined position outside of this card 100. As described later, through these electrodes, information is input to or output from an information reproduction apparatus or information recording/reproducing apparatus (cf. FIG. 9) using card 100 shown in FIG. 3.

A main body of audio card or memory card 100 is composed of, for example, a semiconductor IC having a 64 MB flash memory (EEPROM) incorporated with a microcomputer and its peripheral devices.

As shown in (a) of FIG. 3, audio card 100 has a copy protection function, thus making it possible to prevent illegal copy or illegal use of the information recorded in audio card 100.

More specifically, audio card 100 itself features the following for an external device (information production apparatus or information recording/reproducing apparatus) independently:

(a) mutual authentication and encode key (encryption key) exchange;

(b) encoded (encrypted) information input/output; and (c) utilization of normal information (decoded or decrypted information) by a party (information reproduction apparatus or information recording/reproducing apparatus) only which has been successfully authenticated by audio card 100.

In addition to such mutual authentication processing and encode key (encryption key) exchange, control CPU (MPU) 101 in the audio card executes information encoding (encrypting) and/or information decoding (decrypting) as well as information input/output interface processing.

A program(s) for running control CPU in the audio card is (are) stored in ROM 102 provided for storing control program associated with authentication/key exchange and with I/O processing.

In the above information reproduction apparatus or information recording/reproducing apparatus (cf. FIG. 9), authentication and identification are performed by individual audio card 100, and the information transferred and input to each card 100 is managed for security.

As means for guaranteeing card-based information management performed by the information recording/reproducing apparatus, audio card 100 has its own unique ID and has a configuration in which a specific encode key (or specific encryption key) can be set.

More specifically, the specific ID (card manufacturer, product name, lot number, serial number, etc.) and the specific encode key (encryption key) information individually assigned to audio card 100 are recorded in recording region (RAM) 103 for the card specific ID information and key information.

Further, audio card 100 with the copy protection function has application data recording region (RAM) 104. In RAM 104, there can be recorded audio information (audio object AOB), still image information (image object IOB), text information (text object TOB), and management information (AOBSI.IFO, IOBSI.IFO, and TOBSI.IFO shown in FIG. 5) for managing these items of information.

As shown in (b) of FIG. 3, the inside of application data recording region (RAM) 104 is composed of boot information recording region 100, file allocation table (FAT) recording region 111, root directory internal information recording region 112, and data region 113.

Here, an FAT format is applied to the file format of data to be recorded in application data recording region (RAM) 104.

When audio card 100 with the copy protection function of FIG. 3 is inserted into an information recording/reproducing apparatus (cf. FIG. 9), this information recording/reproducing apparatus reads the information recorded in boot information recording region 110, and is booted (activated) automatically.

Thereafter, when the information recording/reproducing apparatus reproduces or plays back desired information (music and still image or the like) from card 100, the apparatus reads the file allocation information in FAT recording region 111 so as to recognize the storage address of the desired information to be reproduced. Based on this address, the apparatus accesses application data recording region (RAM) 104.

In data region 113, audio related information recording region 121 and one or more general computer information recording region(s) 120 can be arbitrary mixed and set as shown in (c) of FIG. 3.

As shown in (d) of FIG. 3, audio related information recording region 121 is composed of: management information recording region 130; audio object (AOB) recording region 131; image object (IOB) recording region 132; and text object (TOB) recording region 133.

The audio information recorded in audio card 100 is stored in AOB recording region 131, the still image information recorded in audio card 100 is stored in IOB recording region 132, and the text information recorded in audio card 100 is stored in TOB recording region 133.

The management information (e.g., map information) concerning these audio information, still image information and text information, and the management information (e.g., search pointer) indicative of the relationship between these items of information are stored in management information recording region 130.

The inside of management information recording region 130 is divided into four recording regions, as shown in (e) of FIG. 3.

More specifically, management information recording region 130 is composed of: program chain set information (PGCSI) recording region 140; audio object set information (AOBSI) recording region 141; image object set information (IOBSI) recording region 142; and text object set information (TOBSI) recording region 143.

PGCSI recording region 140 is composed of, as shown in (f) of FIG. 3, original PGC (ORG_PGC) information recording region 150 for storing original program chain information, and one or more user defined PGC (UD_PGC) recording regions 151, 152, . . . for storing program chain information newly defined by the user during use of card 100.

ORG_PGC information recording region 150 is composed of, as shown in (g) of FIG. 3, recording region 160 for information indicative of a total number of cells (information units configuring the PGC) existing in an original PGC, and one or more cell information (CI) recording regions 161, 162 . . . .

In audio card (memory card)100 having the above data structure, the recording contents such as music information are stored in the predetermined places provided in recording regions 131 to 133 shown in (d) of FIG. 3. In addition, after the user has edited the stored recording contents (such as music combining, dividing, erasing, moving or the like), the management information (e.g., a method for reproducing the edited music number and the corresponding image and/or the corresponding text) is stored in the predetermined places provided in recording region 130 shown in (d) of FIG. 3.

According to the embodiment of the present invention, as memory card 100 with its copy protection function shown in FIG. 3, there is mainly proposed an audio card for recording audio information, image information, and/or text information protected from illegal copy and/or illegal use. However, memory card 100 shown in FIG. 3 is not limited to such audio information only, and can be utilized to record an application file (or PC data) such as a file of word processor or of spread sheet available for use in a general personal computer PC (the recording region for this purpose is denoted by reference number 120 in (c) of FIG. 3).

In this case, authentication/key exchange and I/O processing related control program stored in ROM 102 as well as card specific ID and key information stored in RAM 103, both shown in (a) of FIG. 3, may be properly utilized so that illegal copy and/or illegal use of an application file (or PC data) of word processor, spread sheet, game, or the like can be prevented.

Namely, memory card 100 shown in FIG. 3 can be utilized as package media for distributing (with or without charge) a computer program (application program, game program or the like) to be protected from illegal copy and/or illegal use.

Figure 4:
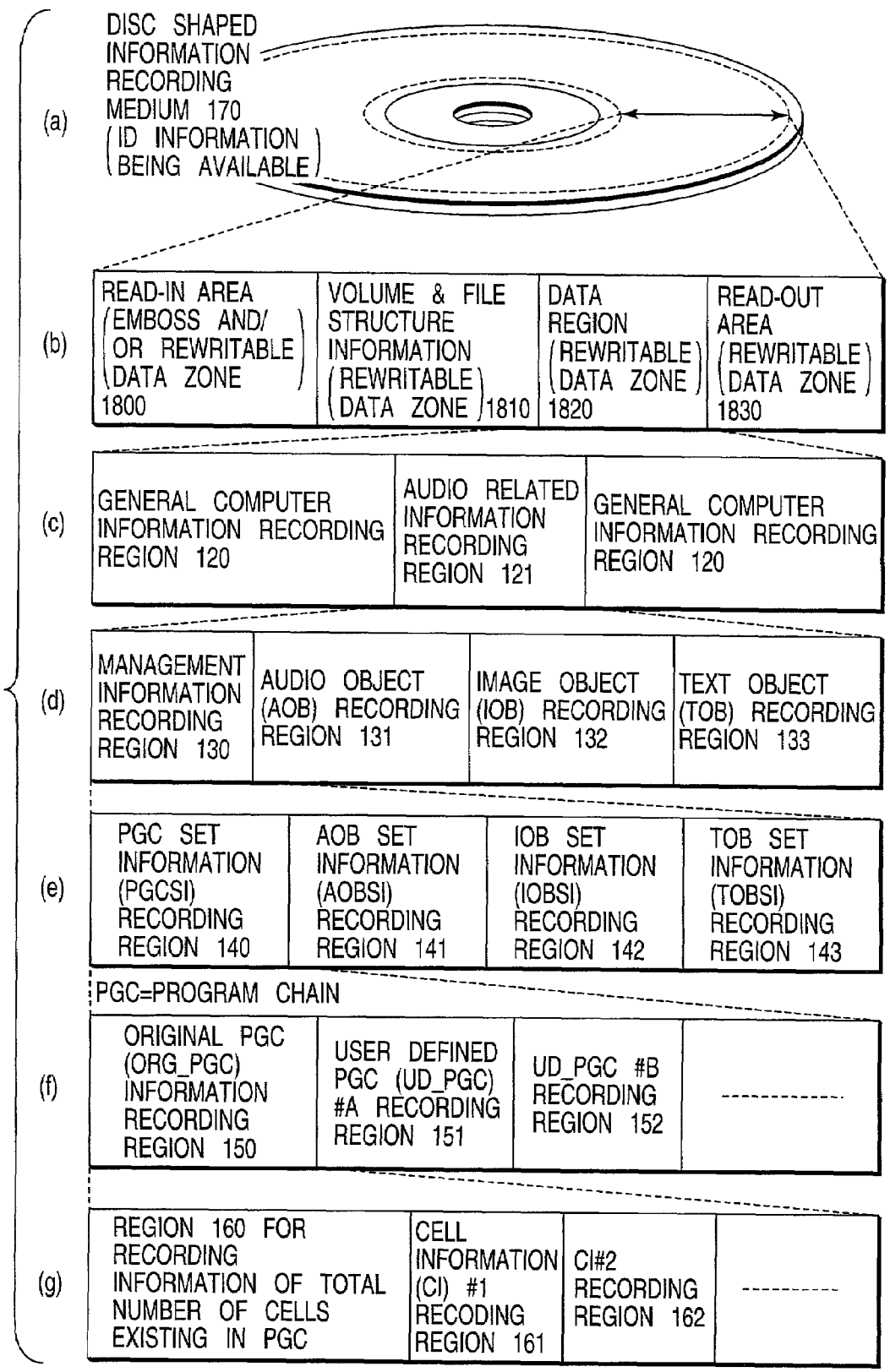
FIG. 4 is a view illustrating a recording format of an optical disc that is an information storage medium according to another embodiment of the present invention.

FIG. 4 is a view illustrating a recording format of an optical disc that is an information storage medium according to another embodiment of the present invention.

Although audio card (memory card) 100 shown in (a) of FIG. 3 is a card shaped medium in which the medium itself does not move mechanically while in use, medium 170 shown in (a) of FIG. 4 is a disc shaped medium in which the medium itself rotationally moves while in use.

Specific examples of disc shaped medium 170 capable of recording and reproducing include: hard disc HDD (in particular, HDD having its removable recording medium portion); a large capacity floppy disc drive FDD (in recent years, floppy discs of 100 MB or more in capacity is commercially available); a magneto-optical disc MO; DVD-RAM, DVD-R, DVD-RW, and the like.

Although the FAT format is adopted as a HDD or MO file format described by referring to (b) of FIG. 3, a universal disc format (UDF) is adopted for DVD-RAM, DVD-R, or DVD-RW.

Here, a data structure of disc shaped medium 170 will be described on the assumption of the DVD family disc (for example, recording and reproducing DVD audio disc) adopting the UDF format.

That is, read-in area 1800 is disposed at the inner periphery of disc shaped medium 170, and read-out area 1830 is disposed at the outer periphery thereof. Volume and file structure information 1810 and data region 1820 are disposed therebetween. Each of these areas 1800 and 1830 and regions 1810 and 1820 contains a rewritable data zone.

Rewritable data region 1820 shown in (b) of FIG. 4 has a hierarchical data structure as shown in (c) to (g) of FIG. 4. This data structure is the same as that described by referring to (c) to (g) of FIG. 3.

Figure 5:
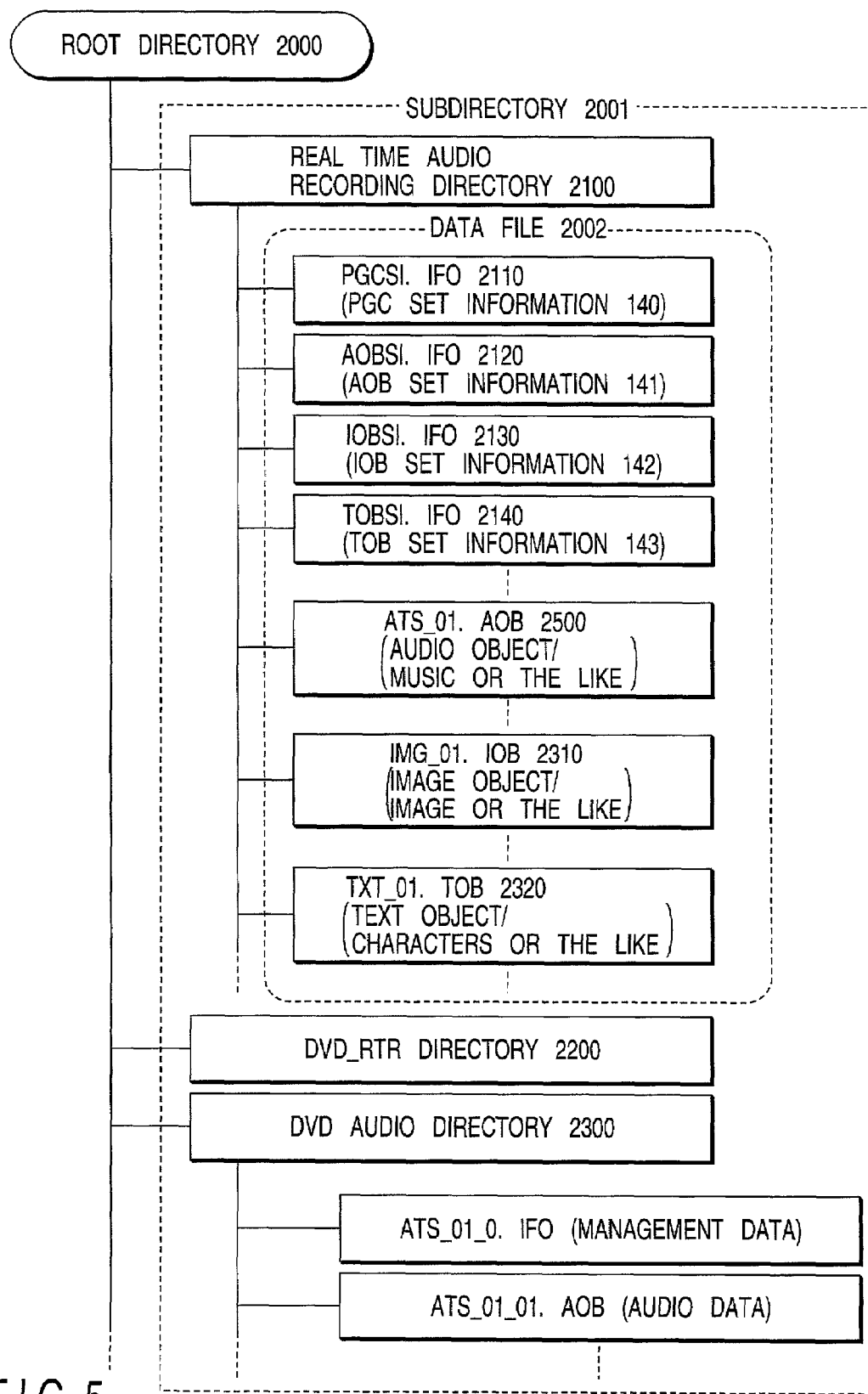
FIG. 5 is a view illustrating a directory configuration (hierarchical structure of recording files) of a variety of information stored in the information storage medium shown in FIG. 3 or FIG. 4.

In the case of providing access to the information (for example, a file with the directory structure as shown in FIG. 5 described later) recorded in disc shaped medium 170, volume and file structure information 1810 is first reproduced. This volume and file structure information 1810 contains UDF information for providing access to the data file as shown in FIG. 5.

FIG. 5 is a view illustrating the directory structures (recording file hierarchical structures) of a variety of information stored in memory card 100 shown in FIG. 3 adopting FAT or in disc shaped medium 170 shown in FIG. 4 adopting UDF.

The information recorded in application data recording region (RAM) 104 shown in (a) of FIG. 3 has a directory hierarchical structure as shown in FIG. 5, and the information contained in root directory 2000 shown in FIG. 5 is recorded in information recording region 112 provided in the root directory shown in (b) of FIG. 3.

Alternatively, the information recorded in data region 1820 shown in (b) of FIG. 4 has a directory hierarchical structure as shown in FIG. 5; and the information contained in root directory 2000 shown in FIG. 5 is recorded in volume and file structure information 1810 shown in (b) of FIG. 4.

Even in the case where audio card 100 with the copy protection function adopting the FAT format is used as an information storage medium as shown in FIG. 3, or even in the case where disc shaped information storage medium 170 adopting the UDF format as shown in FIG. 4 is used, information to be recorded in the information storage medium is recorded in unit of files, as shown in FIG. 5.

The audio information (AOB) with the still image (IOB) having been described with reference to FIGS. 1 and 2 is collectively recorded in sub-directory 2001, called real-time audio recording directory 2100, as shown in FIG. 5.

This real-time audio recording directory 2100 has data file 2002 containing following files 2110 to 2140, 2310, 2320, 2500, . . . as a sub-directory.

The audio information (audio object AOB) to be recorded in the information storage medium shown in FIG. 3 or FIG. 4 is recorded in unit of files such as ATS_01.AOB 2500, . . . , as shown in FIG. 5. Details of audio object file (audio information file) 2500 will be described later by referring to FIG. 8.

This audio information file (ATS_01.AOB2500, . . . ) is recorded and stored in audio recording region 131 shown in (d) of FIG. 3 or (d) of FIG. 4.

In addition, the image information (image object IOB) to be recorded in the information storage medium shown in FIG. 3 or FIG. 4 is recorded as another file such as IMG_01.IOB 2310, . . . for every image (still picture), as shown in FIG. 5.

These image information file (IMG_01.IOB 2310, . . . ) is recorded and stored in image object recording region 132 shown in (d) of FIG. 3 or (d) of FIG. 4.

Further, in the information storage medium shown in FIG. 3 or FIG. 4, text information (text object TOB) such as words for audio information (performed music), item description of performed music, or introduction of performer can also be recorded in unit of files such as TXT_01. TOB 2320, . . . , as shown in FIG. 5.

These text information files (TXT_01. TOB 2320, . . . ) are recorded and stored in text object recording region 133 shown in (d) of FIG. 3 or (d) of FIG. 4.

All of the management information concerning the audio information (audio object AOB) recorded in audio object recording region 131 is collectively recorded in one file 2120 named AOBSI.IFO, as shown in FIG. 5. The recording place of this AOBSI.IFO file 2120 corresponds to audio object set information AOBI recording region 141 in (e) of FIG. 3 or (e) of FIG. 4.

In addition, the management information concerning still image information (image object IOB) recorded in image object recording region 132 is collectively recorded in file 2130 called IOBSI.IFO. The recording place of this IOBSI.IFO file 2130 corresponds to image object set information recording region 142 in (e) of FIG. 3 or (e) of FIG. 4.

Similarly, the management information concerning text information (text object TOB) recorded in text object recording region 133 is collectively recorded in file 2140 called TOBSI.IFO. The recording place of this TOBSI.IFO file 2140 corresponds text object set information recording region 143 in (e) of FIG. 3 or (e) of FIG. 4.

Even in the case where any form of audio card 100 with a copy protection function and disc shaped information storage medium 170 is employed, all of the management information indicative of the reproduction sequence concerning all audio information (All AOBS) recorded in the information storage medium is collectively recorded in one file 2110 named PGCSI.IFO, as shown in FIG. 5. The recording place of this PGCSI.IFO file 2110 corresponds to program chain set information recording region 140 in (e) of FIG. 3 or (e) of FIG. 4.

Here, the program chain (PGC) is composed of one or more cells C as described later, and is structured so that the reproduction sequence of music numbers in PGC can be defined depending on the arrangement order of cells C.

When data of real-time recording/reproducing DVD video (DVD_RTR) is recorded in the data region of the medium shown in FIG. 3 or FIG. 4, DVD_RTR directory 2200 containing DVD_RTR data file(s) is (are) provided as a sub-directory of root directory 2000 shown in FIG. 5.

In addition, when DVD audio data is recorded in the data region of the medium shown in FIG. 3 or FIG. 4, DVD audio directory 2300 containing DVD audio data file(s) (ATS_01.IFO, ATS_01.AOB, or the like) is (are) provided as a sub-directory of root directory 2000 shown in FIG. 5.

Figure 6:
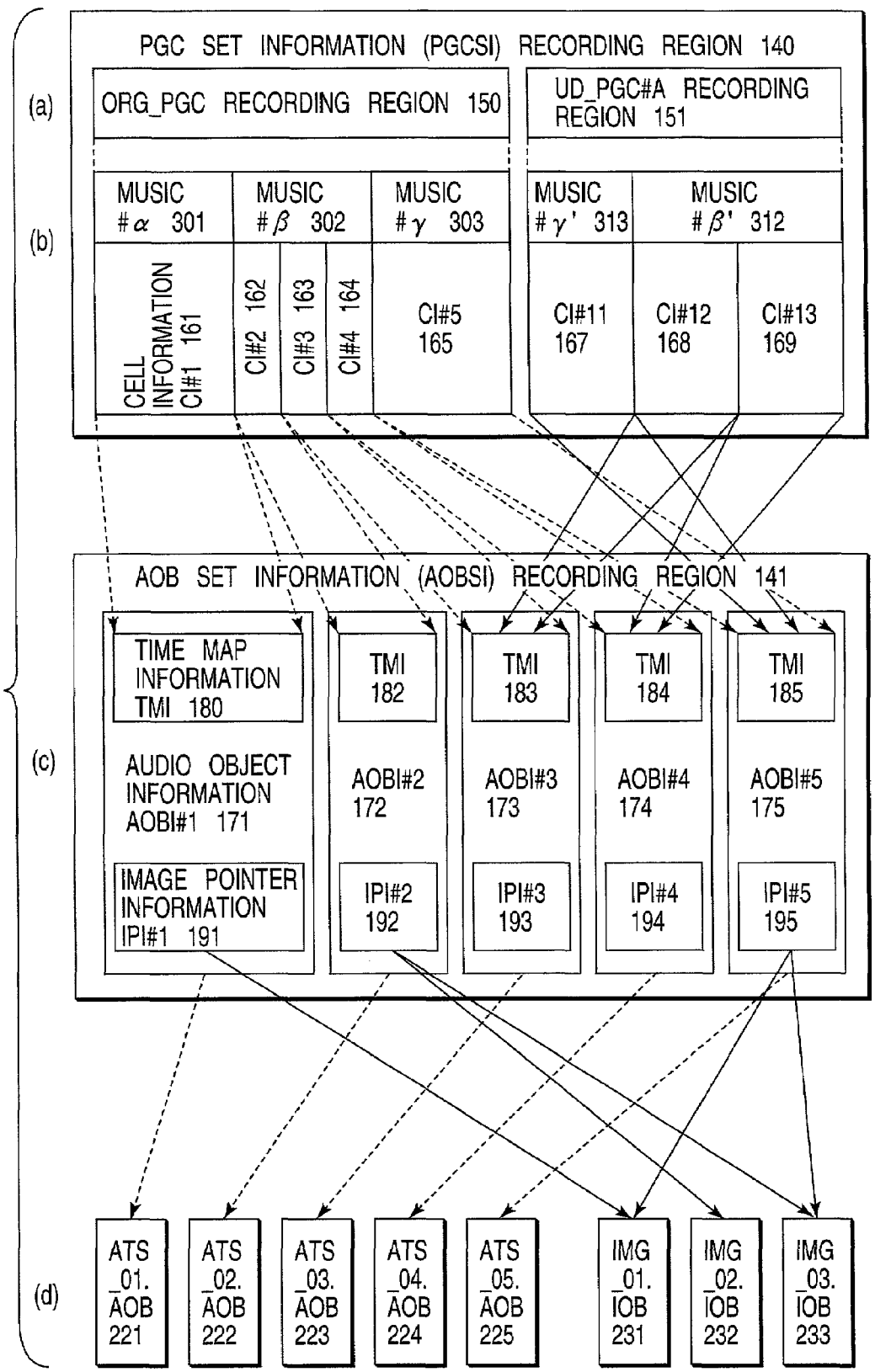
FIG. 6 is a view illustrating an example of a reproduction relationship (the arrows shown in the figure) between a plurality of music numbers and still images accompanying these music numbers stored in the information storage medium shown in FIG. 3 or FIG. 4.

FIG. 6 is a view illustrating an example of a reproduction relationship between a plurality of music numbers stored in the information storage medium shown in FIG. 3 or FIG. 4 and still images accompanying these music numbers. Hereinafter, the relationship between these items of management information will be described by referring to the figure.

In the embodiment of the present invention, all items of the audio information (All AOBS) recorded in the information storage medium are collected by units of "music numbers".

Further, the music numbers recorded in the information storage medium contain information of procedures (sequences) for which all the music numbers are reproduced sequentially and continuously. A region in which the first created sequence information (program chain PGC) is recorded is referred to as original PGC (ORG_PGC) information recording region 150 (cf. (f) of FIG. 3, (f) of FIG. 4, or (a) of FIG. 6).

The management information (AOBSI) concerning audio information (AOB) has respective separate management information units (AOBI#1 to AOBI#5) for individual audio information files (AOB files) such as ATS_01.AOB 221 to ATS_05.AOB 225 (each one corresponds to ATS_01.AOB 2500 shown in FIG. 5). As these management information units, as shown in (c) of FIG. 6, there are set audio object information 171 (AOBI#1), 172 (AOBI#2), 173 (AOBI#3), 174 (AOBI#4), and 175 (AOBI#5).

Audio object information 171 to 175 (AOBI#1 to AOBI#5) respectively have time map information 181 to 185 containing information indicative of a relationship between the reproduction time and the recording place (address) in the medium, in order to enable special reproduction such as time search, fast forward FF, or fast rewinding FR.

According to the embodiment shown in FIG. 6, audio object information 171 to 175 (AOBI#1 to AOBI#5) respectively contain information of image pointer information 191 to 195 (IPI#1 to IPI#5), so that still image information files IMG_01.IOB 231 to IMG_03.IOB 233 can be directly specified or designated from image pointer information 191 to 195 (IPI#1 to IPI#5).

As shown in (b) and (c) of FIG. 6, the size specified by cell information 161 to 165 (CI#1 to CI#5) defined in original PGC information recording region 150 corresponds to all the reproduction range indicated by the corresponding audio object information 171 to 175 (AOBI#1 to AOBI#5) on the one-to-one basis.

As shown in (b) of FIG. 6, music number #α 301, music number #β 302, and music γ 303 are composed of one or more cell information CI. The information of "which music number each cell information IC corresponds to" is described in cell information 161 to 165 (CI#1 to CI#5), respectively.

As described previously, the reproduction sequence of the original PGC is defined depending on the arrangement order of the corresponding cell information CI. However, from the relationship with the music numbers shown in (b) of FIG. 6, the reproduction sequence (or reproduction steps) of each music number is resultantly described in original PGC information recording region 150.

Apart from the reproduction sequence indicated by the original PGC, unique reproduction sequence information defined or prepared by the user is recorded in user defined PGC recording region 151. Cell information 167 to 169 (CI#11 to CI#13) defined in user defined PGC recording region 151 is so configured that the corresponding audio object information AOBI (AOBI#3 to AOBI#5 in (c) of FIG. 6) can be set, and that the reproduction start time as well as reproduction end time in the time map information (TMI 183 to 185 in (c) of FIG. 6) defined in the AOBI can also be set.

Thus, by sequentially arranging the items of cell information CI shown in (b) of FIG. 6, arbitrarily, an optional reproduction sequence relevant to the audio information (audio object AOB) can be defined in user defined PGC recording region 151.

In an example shown in (b) of FIG. 6, cell information 167 (CI#11) specifies part of time map information 185. From this, the reproduction range of music number #γ' 313 reproduced by cell information 167 (CI#11) becomes narrower than the reproduction range of music number #γ 303 defined in the original PGC. Only such narrower range can be reproduced by cell information 167 (CI#11).

In this manner, according to the embodiment of the present invention, an arbitrary or optional range can be reproduced without being limited to the reproduction range of the music numbers defined in the original PGC.

Plural sets of arbitrary reproduction sequences freely prepared by the user can be defined according to user defined PGC recording region 151. The embodiment of the present invention has such a structure that a plurality of user defined PGC recording regions #A•151, #B•152, . . . can be provided, as shown in (f) of FIG. 3 or (f) of FIG. 4, for respective reproduction sequences freely defined by the user.

In the embodiment shown in FIG. 6, image pointer information IPI#2•192 is set such that two still images (or still pictures) for IMG_02_IOB 232 and IMG_03_IOB 233 are displayed during reproduction of music number #β 302.

In the embodiment of the present invention, the still image file information to be displayed by each music number is described in image pointer information IPI#2 (192 in FIG. 6; or 197 in FIG. 7) provided in audio object information 172 (AOBI#2) (cell information 162•CI#2 in FIG. 6 or FIG. 7) to be reproduced first in each music number.

Figure 7:
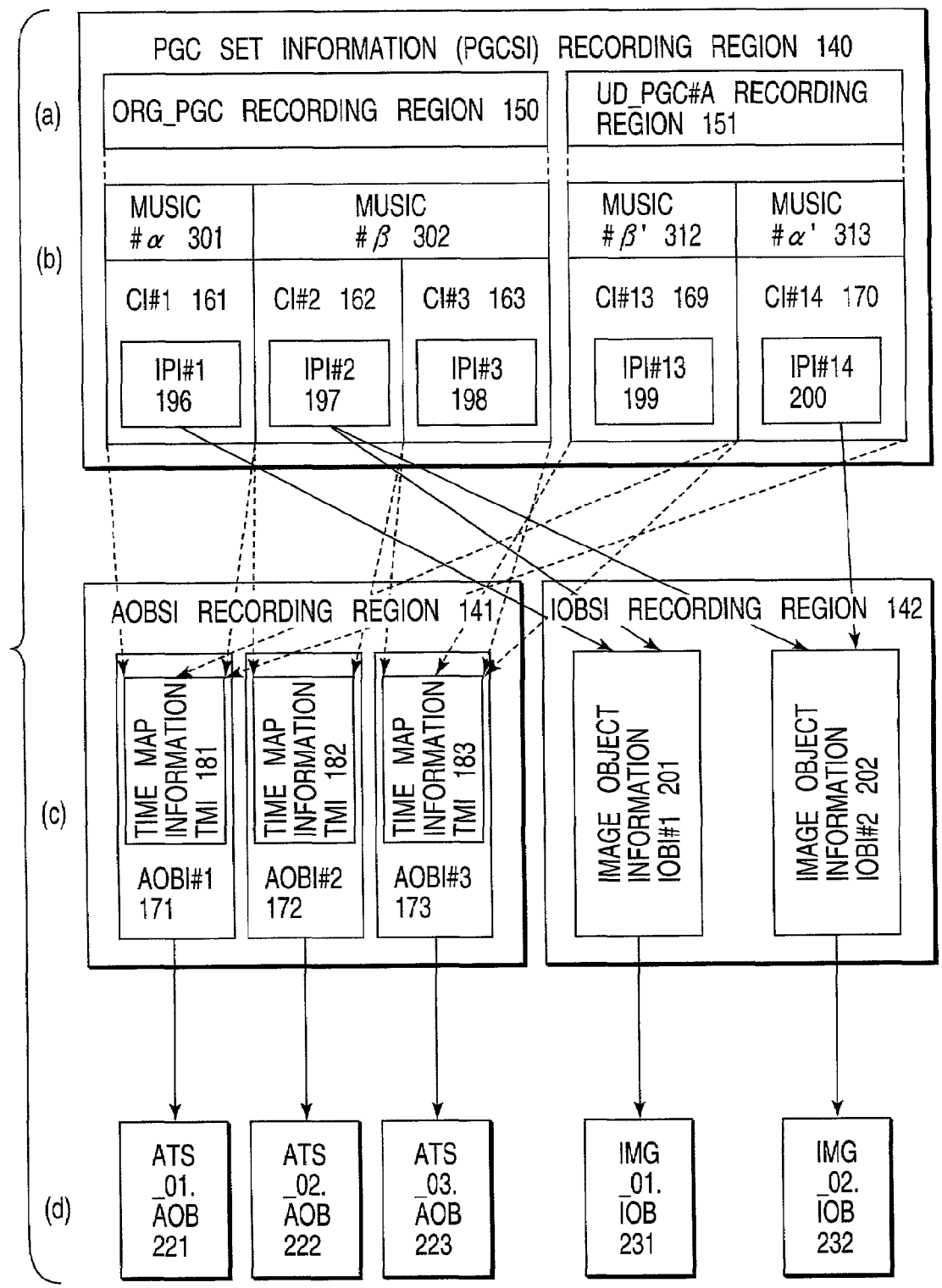
FIG. 7 is a view illustrating another example of a reproduction relationship (the arrows shown in the figure) between a plurality of music numbers and still images accompanying these music numbers stored in the information storage medium shown in FIG. 3 or FIG. 4.

FIG. 7 is a view illustrating another example of a reproduction relationship (the arrows shown in the figure) between a plurality of music numbers stored in the information storage medium in FIG. 3 or FIG. 4 and still images accompanying these music numbers. Hereinafter, the matters different from FIG. 6 will be described.

The embodiment shown in FIG. 7 has image object information 201 and 202 (IOBI#1 and IOBI#2) including management information items respectively relevant to still image information files IMG_01_IOB 231 and IMG_02_IOB 232.

Any of image pointer information 196 to 200 (IPI#1 to IPI#3 and IPI#13 to IPI#14) properly specifies image object information 201 and 202 (IOBI#1 and IOBI#2), thereby providing a structure for specifying still image information files IMG_01_IOB 231 and IMG_02_IOB 232 to be displayed simultaneously during audio information reproduction.

The embodiment of FIG. 7 is different from the embodiment of FIG. 6 in that items of image pointer information 196 to 200 (IPI#1 to IPI#3 and IPI#13 to IPI#14) are disposed respectively in portions of cell information 161 to 163, 169 and 170 (CI#1 to CI#3 and CI#13 to CI#14).

In the embodiment shown in FIG. 6, the still image information file to be displayed during reproduction of music number #γ' 313 and music number #β' 312, each defined in user defined PGC 151, coincides with the still image information file to be displayed during reproduction of music number #β 302 and music number #γ 303, each defined in original PGC 150. Thus, according to a data structure based on this embodiment, the still image information file displayed during reproduction cannot be arbitrarily set or freely changed.

In contrast, in the embodiment shown in FIG. 7, image pointer information IPI# is allocated by each cell information CI#, so that the still image information file displayed during reproduction can be set arbitrarily by each cell.

Figure 8:
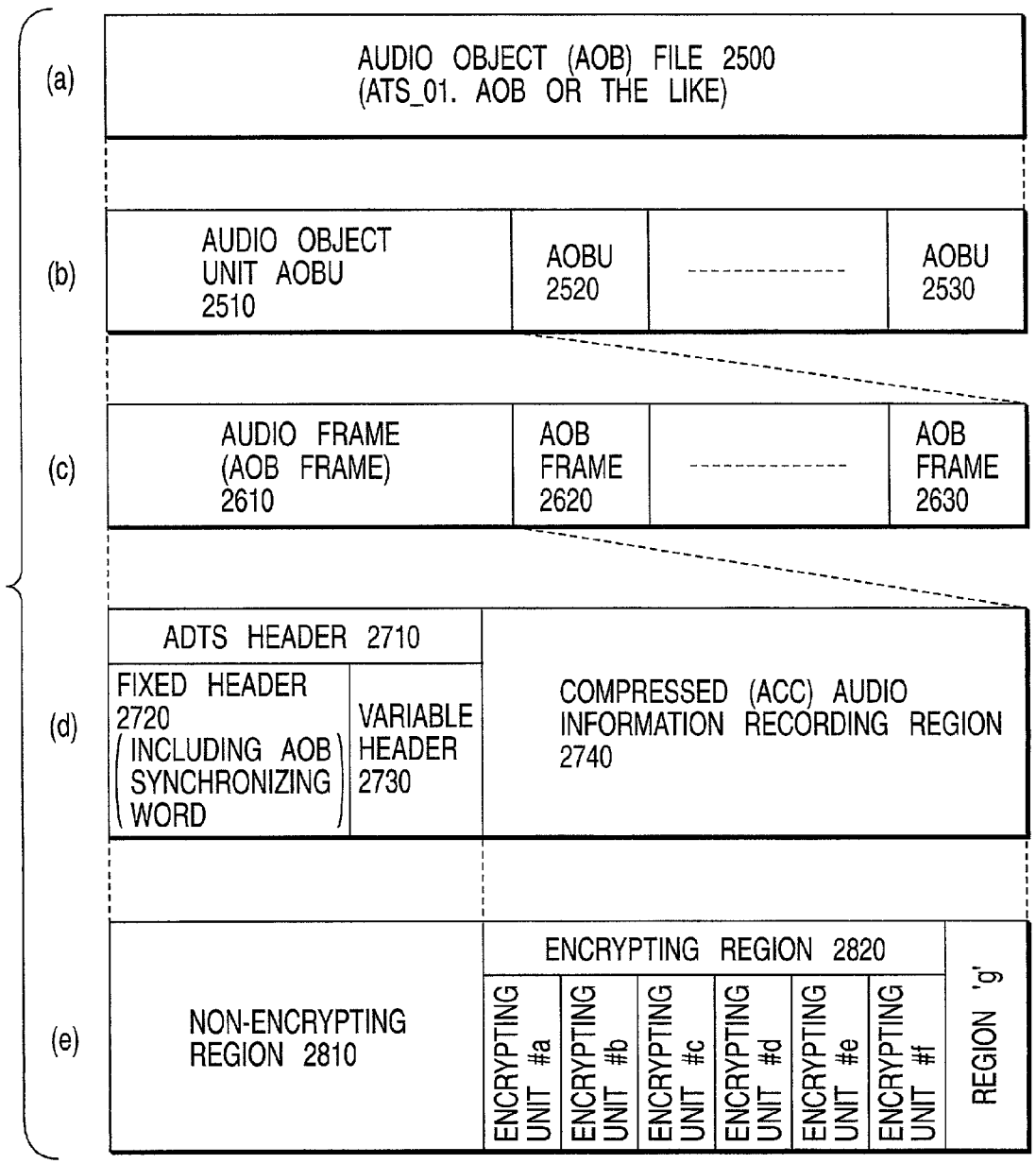
FIG. 8 is a view illustrating an example of a format (data structure) wherein audio information encoded (encrypted) in an audio card with a copy protect function is recorded.

FIG. 8 is a view illustrating an example of a format (data structure) wherein encrypted audio information is recorded in, for example, the audio card with copy protect function shown in FIG. 3.

Hereinafter, a data structure in audio object file 2500 ((a) of FIG. 8) according to the embodiment of the present invention will be described.

The audio information (audio object AOB) is composed of audio objet units AOBU 2510 to AOBU 2530 ((b) of FIG. 8).

These units (AOBU 2510 to AOBU 2530) are configured based on:

(01) dividing by specific data size (32 k bytes, 16 k bytes, 512 bytes, etc.) to provide divided units;

(02) dividing by a specific number of audio frame to provide divided units;

(03) dividing by reproduction time (0.2 second, one second, 2 seconds, 5 seconds, 10 seconds, etc.) to provide divided units; and so on In the embodiment of the present invention, MPEG AAC system (advanced audio coding) is adopted for audio information compression.

As shown in (c) of FIG. 8, audio object file 2500 is composed of a set of plural audio frames 2610 to 2630.

The number of audio frames contained in each audio object file 2500 is described in audio object information AOBI. Therefore, the "total number of frames for each music number" can be obtained by utilizing information relating to AOBI and the corresponding music number described in cell information CI.

The information of the "total number of frames for each music number" is recorded in audio object information (for example, AOBI#2•172 in music number #β) corresponding to the audio information file to be reproduced first in the music.

In the AAC system, each inside of audio frames (AOB frames) 2610 to 2630 shown in (c) of FIG. 8 is composed of ADTS (advanced audio coding transport stream; or audio data transport stream) header 2710 and compressed audio information recording region 2740 shown in (d) of FIG. 8.

Further, ADTS header 2710 is composed of fixed header 2720 including AOB synchronizing words and variable header 2730 as shown in (d) of FIG. 8.

In a method for encrypting audio information (AOB), as shown in (e) of FIG. 8, the contents of ADTS header 2710 are placed in non-encrypting region 2810 (in a plain state being free from encrypting), whereas encrypting is sequentially done from the head position of compressed audio information recording region 2740 by encrypting units (#a to #f).

For example, computation processing is performed to the data in encrypting units (#a to #f) in accordance with an encryption key generated based on random numbers, and the computation result is recorded as encrypting information. Encrypting is performed in these encrypting units (#a to #f), and the computation processing based on the above encryption key is repeated by encrypting units (#a to #f).

In the embodiment of the present invention, the encrypting units (#a to #f) are defined in units of 64 bits or 56 bits. The size of compressed audio information recording region 2740 does not always coincide with a multiple of 64 bits. For this reason, in compressed audio information recording region 2740, only region "g" that is a remainder (a fractional portion) caused by dividing a multiple of encrypting units is maintained in a plain state being free from encrypting.

Namely, the non-encrypting region "g" is provided as a sort of a padding area for ensuring that the size of compressed audio information recording region 2740 is made coincident with a multiple of 64 bits.

Incidentally, encrypting region 2820 is formed of the encrypting units (#a to #f), and compressed audio information recording region 2740 is formed of encrypting region 2820 and the padding region "g".

FIG. 9 is a block diagram illustrating an example of an apparatus for recording or reproducing information for audio card (memory card) 100 with copy protect function shown in FIG. 3.

First, a configuration of a recording system capable of writing into audio card (memory card) 100 the information (audio information and/or still picture information) to be copy protected.

A digital camera is a popular device that digitally records still image information handled by the apparatus shown in FIG. 9. In addition to such a digital camera, still image information to be digitally recorded is utilized for menu images or the like in a DVD video system for digitally recording/reproducing movie information (I picture of MPEG can be regarded as still image information).

As means for inputting such still image information into the device shown in FIG. 9, there are:

(11) means for capturing into video capture section 3510 an video signal from CCD camera 3610 or TV tuner 3620 to convert a still image, and then, converting into a digital signal the still image captured by an A/D converter (not shown) incorporated in video capture section 3510, to thereby input the digital signal to switching section (data bus line) 3210 for input data transfer destination;

(12) means for transmitting the still image information photographed by digital camera 3630 to I/F processing section 3520 for the digital camera, using, for instance, a serial transmission line such as RS-232C, so that the transmitted information is supplied to input data transfer destination switching section 3210; and

(13) means for supplying, via inter-PC data I/F processing section 3540, input data transfer destination switching section 3210 with the still image information (such as computer graphics) produced by personal computer (PC) 3640 or the still image information captured by an image scanner (not shown) connected to this PC.

Further, as means for inputting text information into the apparatus shown in FIG. 9, there are:

(14) means (3530) for inputting key input data from a keyboard to input data transfer destination switching section 3210; and

(15) means (3530) for selecting and specifying character(s) by a dialing/dial-in device utilized in a digital camera recorder, etc., so that character codes such as JIS or ASCII are input to data transfer destination switching section 3210.

Still further, as means for inputting audio information into the apparatus shown in FIG. 9, there are:

(16) means for digitizing by ADC 3350 an analog audio signal (for example, an analog reproduction/playback output of a CD player) externally inputted via analog input terminal 3570, and subjecting the digitized data to, for example, MPEG2/AAC compression coding by audio encoder 3310 so as to input the coded data to input data transfer destination switching section 3210 (note that it can be determined by an instruction from system control section 3020 as to whether or not compression is performed by audio encoder 3310 or as to what compression system is adopted if compression is done);

(17) means for digitizing by ADC 3350 an analog audio signal inputted from voice input microphone 3650 via a microphone input terminal 3560, and subjecting the digitized data to MPEG2/AAC compression coding by audio encoder 3310 so as to input the coded data to input data transfer destination switching section 3210;

(18) means for subjecting to MPEG2/AAC compression coding by audio encoder 3310 a digital audio signal (for example, linear PCM digital output from a CD player) externally inputted via a digital input terminal 3580, and inputting the coded data to input data transfer destination switching section 3210; and

(19) means for directly capturing already-compressed digital audio information through WWW (World Wide Web) or Internet using a modem (not shown) and data input PC 3640, and inputting the captured data to input data transfer destination switching section 3210 via inter-PC data I/F processing section 3540.

Desired information (for example, JPEG compression still picture information from digital camera 3630, and MPEG compression audio information from audio encoder 3310) is selected from a variety of digital information inputted by the above method under the control of system control section 30020.

Then, the selected information (JPEG compression still picture information and MPEG compression audio information) is transferred to an information recording and reproducing section 3000 through input data transfer destination switching section (data bus line) 3210.

For the audio input information or still image information transferred to information recording and reproducing section 3000, information of analog copy generation management system CGMS-A may be accompanied in the case of an analog input signal; and information of digital copy generation management system CGMS-D may be accompanied in the case of a digital input signal.

When information (2-bit flag) of "any frequent copying enabled, or copy-free" is described as the information of the copy generation management system CGMS, encode processing is not required. Then, the input information is transferred from input data transfer destination switching section 3210 to information recording and reproducing section 3000, while the transferred input information is in a plain state being free of encrypting.

On the other hand, in the case where copy limitation is specified by CGMS-A or CGMS-D, the copy limited information is transferred from input data transfer destination switching section 3210 to encryption processing section 3110.

At encryption processing section 3110, copy limited information is encrypted based on the encryption key generated randomly by encryption key generating/storage section 3140 (refer to (e) of FIG. 8 for the encrypting method).

The audio information and/or still image information encrypted by encryption processing section 3110 are/is transferred to mutual authentication/key exchange & encryption information I/F control section 3120.

From mutual authentication/key exchange & encryption information I/F control section 3120, the encrypted audio information and/or encrypted still image information are/is transferred to information recording and reproducing section 3000. The information transferred to information recording and reproducing section 3000 is accompanied with CGMS-A or CGMS-D copy limitation information (2-bit flag) as needed.

When the information of "only one generation copy enabled" is described as CGMS information, the encryption decode key (or decryption key) is accompanied with this CGMS information, and the encrypted audio input information as well as the decryption key with the CGMS information are transferred from mutual authentication/key exchange & encryption information I/F control section 3120 to information recording and reproducing section 3000.

When the information of "copying disabled, or copy never" is described as CGMS information, the encrypted audio input information without the decryption key is transferred from mutual authentication/key exchange & encryption information I/F control section 3120 to information recording and reproducing section 3000, together with the CGMS information.

Alternatively, in the case where the information of "copying disabled, or copy never" is described as CGMS information, only a warning message such as "this program is copyright reserved, and copying or recording is prohibited" may be transferred from mutual authentication/key exchange & encryption information I/F control section 3120 to information recording and reproducing section 3000, so that any recording cannot be made, except for recording of the above warning.

The above CGMS information (2-bit flag indicative of copy limitation type or warning message for copyright reserved) can be written into card specific ID & key information recording region (RAM) 103 of audio card (memory card) 100 shown in (a) of FIG. 3, for example.

Alternatively, in optical disc 170 shown in (a) of FIG. 4, for example, the above CGMS information (2-bit flag indicative of copy limitation type or warning message for copyright reserved) can be written into the rewritable data zone of read-in area 1800 or into management information recording region 130 shown in (d) of FIG. 4.

The operation (a selectable encrypting operation according to the contents of CGMS information) of the above encryption processing related portions (3110 to 3140) is controlled by system control section 3020.

More specifically, information recording and reproducing section 3000 comprises:

(21) a contact type electrode portion in the case where the information storage medium is an audio card (memory card) 100;

(22) an HDD internal magnetic head and an HDD rotation control circuit in the case where the information storage medium is a removable hard disc; and

(23) an optical head and a disc rotation control circuit in the case where the information storage medium is an optical disc capable of recording and reproducing (in FIG. 9, there is shown a case in which memory card 100 is employed).

A description of the configuration shown in FIG. 9 will be continued, assuming that the CGMS copy managed audio information and/or still picture information is recorded/reproduced for audio card (memory card) 100.

At the same time, mutual authentication processing and key exchange processing between audio card (memory card) 100 and the apparatus shown in FIG. 9 will be described in parallel by referring to FIG. 10.

When audio card (memory card) 100 shown in (a) of FIG. 3 is loaded (by the user) to information recording and reproducing section 3000 shown in FIG. 9, card 100 is powered from information recording and reproducing section 3000 side via card electrodes (not shown). Then, an authentication/key exchange & I/O processing related program stored in ROM 102 shown in (a) of FIG. 3 is started by control CPU/MPU 101 in card 100.

By means of this program, mutual authentication and key exchange are executed between encryption/decryption processing section 3010 and audio card 100.

More specifically, in the process of authentication processing/key exchange, a challenge key is generated by encryption key generating/storage section 3140, and the generated key is encrypted (encoded) by encryption processing section 3110. Then, the encrypted key is sent to audio card 100 via mutual authentication/exchange & encryption information I/F control section 3120. Then, the encrypted challenge key is decrypted and authenticated in audio card 100.

Further, a response key stored in RAM 103 of the card specific ID information & key information recording region is encrypted and sent to encryption/decryption processing section 3010. Then, the encrypted response key is decrypted and authenticated in encryption processing section 3110.

In these authentication processes, the counterpart ID is mutually checked.

For example, CPU/MPU 101 of card 100 shown in (a) of FIG. 3 reads the ID being specific to the apparatus shown in FIG. 9 via information recording and reproducing section 3000 (this ID is written in advance in a ROM (not shown) in information recording and reproducing section 3000). By so doing, it possible to check whether or not the apparatus normally matches its identity (card 100).

Similarly, system control section 3020 shown in FIG. 9 reads the ID being specific to card 100 shown in (a) of FIG. 3 via information recording and reproducing section 300, thereby making it possible to check whether or not the card normally matches its identity (apparatus of FIG. 9).

Figure 10:
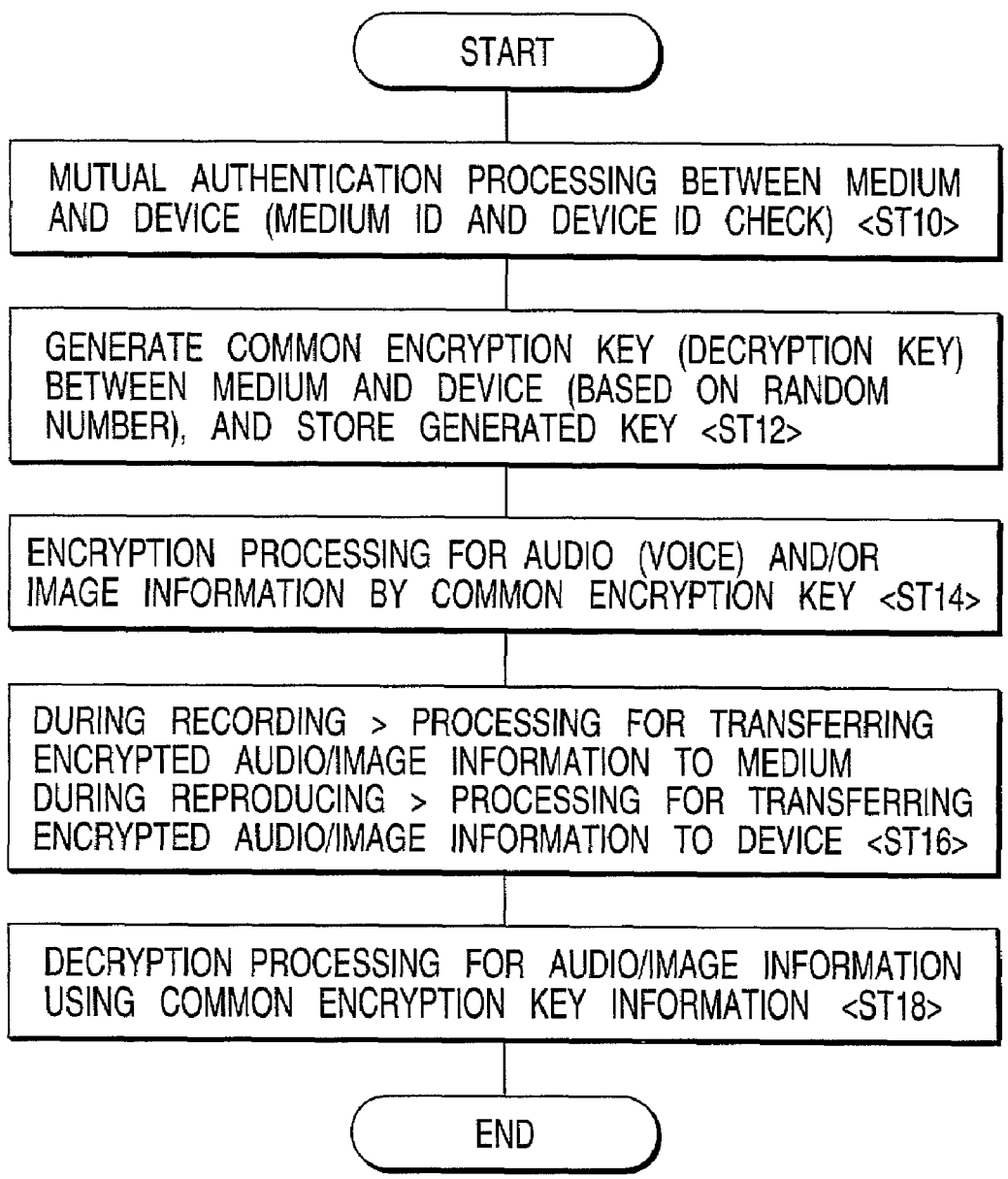
FIG. 10 is a flow chart illustrating the process of mutual authentication and encode (encryption) key exchange to be performed between the audio card shown in FIG. 3 (or optical disc shown in FIG. 4) and the recording/reproducing apparatus shown in FIG. 9.

In this way, mutual authentication between card 100 and the apparatus shown in FIG. 9 is performed (step ST10 in FIG. 10).

If the above mutual authentication fails, although not shown in FIG. 10, the subsequent processing is canceled, and no information is recorded into or reproduced from card 100.

When the above authentication is done successfully (or when the authentication is OK), a common encryption key (or common encryption/decryption key), which is common to audio card 100 and encryption/decryption processing section 30110, is generated based on random numbers or the like. Then, the common encryption key (decryption key) information is temporarily stored in both of RAM 103 of the card specific ID information & key information recording region and the encryption key generating/storage section 3140 (step ST12).

In this way, both of card 100 and the apparatus shown in FIG. 9 have common key information required for the decryption.

When a series of the above mutual authentication/key exchange processing is completed, encryption processing section 3110 encrypts digital information (voice/audio information or picture/image information) sent from input data transfer destination switching section 3210, by utilizing the generated common encryption key (step ST14).

In this encoding, encrypting conversion (e.g., shuffling randomly in encrypting units) is effected by encrypting units (64 bits) on compressed audio information recording region 2740, as shown in (d) and (e) of FIG. 8, and thus the data is re-written.

At that time, no encrypting conversion is performed for ADTS header 2710 section and the region "g" of the fractional portion. The data (contents of ADTS header 2710 and region "g"), not being subjected to the encrypting conversion and kept in a plain state free of encrypting, is transferred to information recording and reproducing section 3000.

Then, the encrypted digital information is transferred to card 100, and is recorded into a predetermined portion of data region 113 of card 100 (when recording is performed at step ST16).

Here, in the case where the information to be copyright reserved is recorded in card 100, the CGMS-D information is transferred and recorded simultaneously.

On the other hand, when the encrypted information is reproduced, data (voice/audio information or picture/image information) being subjected to the encrypting conversion in encrypting units as well as data of encrypting free ADTS header 2710 portion and the region "g" portion are transferred from card 100 to encryption/decryption processing section 3010 via information recording and reproducing section 3000 (when reproduction is performed at step ST16).

Then, the transferred, encrypting-converted data are decrypted by decryption processing section 3130 (step ST18), and is transferred to output data/control information transfer destination switching section (data/command bus line) 3220.

The above-mentioned encrypting-converted data contains the CGMS-D information if it is copyright reserved.

Hereinafter, an example of reproduction processing will be described in more detail.

In the case of reproducing information recorded in audio card 100 with the copy protection function, information recording and reproducing section 3000 reads the information in program chain set information recording region 140 shown in (e) of FIG. 3. After at least part of the read information has been stored in the memory section (RAM) provided in system control section 3020, an audio information file to be reproduced is searched using the information temporarily stored in the memory section.

Before reproducing the audio information file, information of CGMS-D related to the audio information is read. Then, it is determined by system control section 3020 whether the read information is directly transferred to output data/control information transfer destination switching section 3020 or the read information is transferred to this section 3020 via encryption/decryption processing section 3010. Then, either one of the transfer routes is selected according to the result of determination done by system control section 3020.

In the case where the encrypted information is transferred from information recording and reproducing section 3000, the processing of mutual authentication/key exchange is performed at steps ST10 to ST12 of FIG. 10. Then, a common encryption key is held by both of encryption/decryption processing section 3010 and audio card 100.

The encrypted information inputted to decryption (decode) processing section 3130 via mutual authentication/key exchange & encryption information I/F control section 3120 has a structure as shown in (e) of FIG. 8.

This encrypted information is decrypted (decoded) by decryption processing section 3130 in encrypting units based on the common encryption key, and the decrypted plain information is re-arranged in encrypting units so as to retrieve its original data arrangement.

The (decrypted, plain) digital information transferred from output data/control information transfer destination switching section (data/command bus line) 3220 may be processed as follows.

(31) Audio information is decoded by audio decoder 3220, and is returned to a linear PCM signal. Then, the linear PCM signal is temporarily stored in audio buffer 3410.

(32) Text information is subjected to character-conversion (conversion of codes to characters) by character generator 3340, and the converted characters are temporarily stored as image information in text line buffer 3420.

(33) Still image information, compressed by JPEG or MPEG (I picture) or the like, is converted into bit map information in image decoder 3330, and the converted bit map information is temporarily stored in page buffer 3430.

(34) Still image information in bit map format temporarily stored in page buffer 3430 is combined, as needed, with text information image temporarily stored in line buffer 3420 by means of video processor section 3370, so that one combined image is generated.

Thus obtained combined image is properly displayed at image display section 3710 such as color liquid crystal panel.

On the other hand, audio information temporarily stored in audio buffer 3410 is transferred by each frame to D/A converter (DAC) 3360, and the transferred audio information is converted into an analog signal. Then, the converted analog signal is supplied to external output terminal 3720 to which connected is an amplifier for driving a speaker or the like.

Incidentally, display timing at image display section 3710 for text or still image information during reproduction of audio information can be controlled in synchronism with the reproduced audio frame number.

At system control section 3020 shown in FIG. 9, for example, a value obtained by dividing "total number of frames" of music number #β shown in (b) of FIG. 6 by "number of still images displayed during reproduction" is set as "number of audio frames to be reproduced per still image".

The audio frame number being reproduced (or the accumulated number of audio frames) is always monitored at system control section 3020. When the reproduced audio frame number reaches its predetermined value, the still image information in page buffer 3430 to be transferred to image display section (color liquid crystal display) 3710 is changed.

Any of the aforementioned "combining music" and "dividing music" by referring to FIG. 2 can be mainly done by system control section 3020 shown in FIG. 9. The changed management information (CI# or AOBI#) is transferred to information recording and reproducing section 3000 via output data/control information transfer destination switching section (data/command bus line) 3220.

As a result, the information in management information recording region 130 shown in (d) of FIG. 3 is rewritten. In addition, during "dividing music" processing, the information (audio data corresponding to AOBI#3, AOBI#5, AOBI#6 in the example of (c) and (d) of FIG. 2) contained in audio object recording region 131 is changed (this is the processing of dividing the audio information file from AOBI#3 into AOBI#5 and AOBI#6).

When optical disc 170 shown in FIG. 4 is employed for information recording and reproducing section 3000 shown in FIG. 9, unlike memory card 100, disc 170 does not have control CPU/MPU 101. In this case, the aforementioned processing of FIG. 10 can be performed at the side of mutual authentication/key exchange & encryption information I/F control section 3120.

More specifically, when disc 170 is inserted into information recording and reproducing section 3000, mutual authentication/key exchange & encryption information I/F control section 3120 inquires disc 170 for the disc specific ID.

Then, disc 170 answers its own ID (disc manufacturer, product name, lot number, serial number or the like) recorded in read-in area 1800, etc. shown in (b) of FIG. 4.

On the other hand, the mutual authentication/key exchange & encryption information I/F control section 3120 has an internal ROM (not shown) containing an ID table for the available medium(s). This section 3120 checks whether or not the internal ID table contains available medium information corresponding to the disc specific ID answered from disc 170. If the internal ID table contains information that matches the disc specific ID, then mutual authentication is established between disc 170 and the apparatus shown in FIG. 9.

More specifically, when optical disc 170 is loaded (by the user) to information recording and reproducing section 3000 shown in FIG. 9, mutual authentication/key exchange & encryption information I/F control section 3120 reads the ID of disc from, for example, read-in area 1800 of optical disc 170, and checks the counterpart by referring to its own ID table, etc. of the apparatus shown in FIG. 9 (step ST10 of FIG. 10).

The subsequent processing (steps ST12 to ST18 of FIG. 10) may be similar to a case wherein memory card 100 is employed, except for the fact that the subsequent processing is executed on the side of mutual authentication/key exchange & encryption information I/F control section 3120 shown in FIG. 9.

Figure 11:
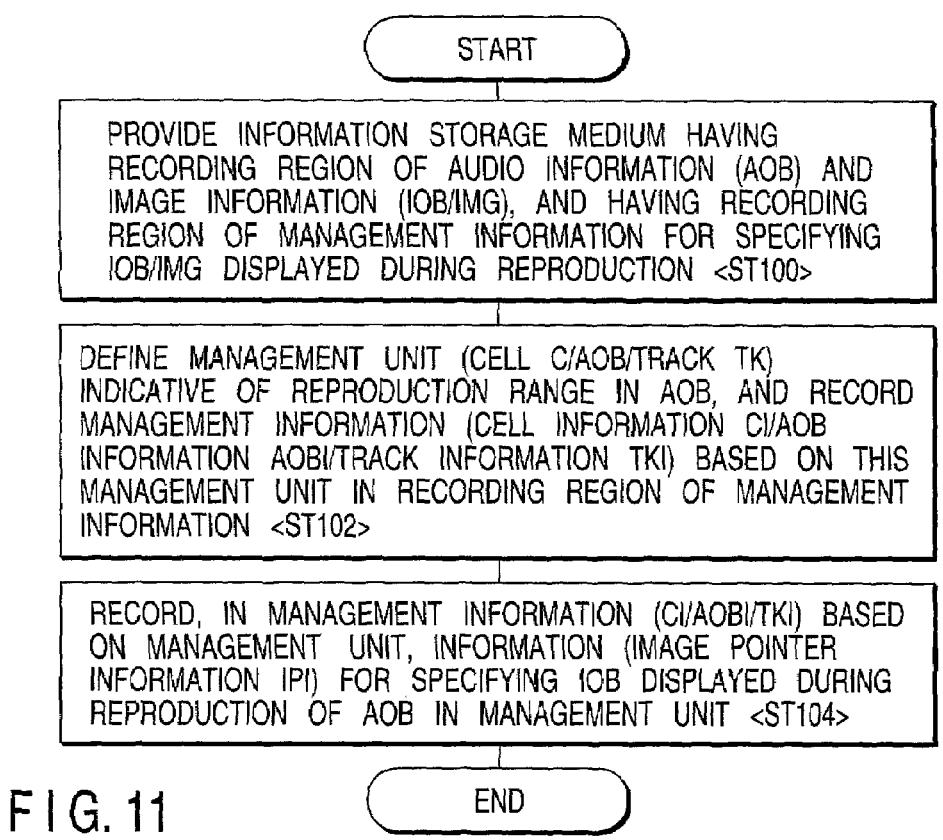
FIG. 11 is a flow chart illustrating the process of recording audio information with image information in the audio card shown in FIG. 3 (or optical disc shown in FIG. 4)

FIG. 11 is a flow chart illustrating the procedure for recording audio information with image information in the audio card shown in FIG. 3 (or in the optical disc shown in FIG. 4). This procedure can be executed by system control section 3020 shown in FIG. 9, for example.

First, in addition to a recording region for the audio information (audio object AOB) and image information (image object IOB/IMG), audio card 100 shown in FIG. 3 (or optical disc 170 shown in FIG. 4) is provided as an information recording medium having the management information (AOBI shown in (c) of FIG. 6 which can contain image pointer information IPI, or CI shown in (b) of FIG. 7 which can contain IPI) for specifying image information (image object IOB/IMG) to be displayed during reproduction (step ST100).

A still image that can be displayed at the same time as reproduction of audio information (AOB) or the like is employed as the image information (IOB/IMG).

Next, a management unit (cell C, audio object AOB, or track TK) indicative of the reproduction range in AOB is defined. The management information (cell information CI, audio object information AOBI, or track information TKI) based on the management unit is recorded in the management information recording region (AOBSI recording region 141 shown in (e) of FIG. 3, (e) of FIG. 4, or (c) of FIG. 6; or CI recording region 161 shown in (g) of FIG. 3, (g) of FIG. 4, or (b) of FIG. 7, etc.) (step ST102).

In this step, in the case where the above AOB represents a music number, the management unit (cell C/AOB/track TK) indicative of the reproduction range in music number size or audio information (AOB) smaller in size than the music number is defined, in order to simplify the management information change processing before and after combining music, for example.

Next, the information (image pointer information IPI) for specifying the IOB to be displayed while the AOB in the management unit is reproduced is recorded in the management information (CI/AOBI/TKI) based on the management unit (step ST104).

Figure 12:
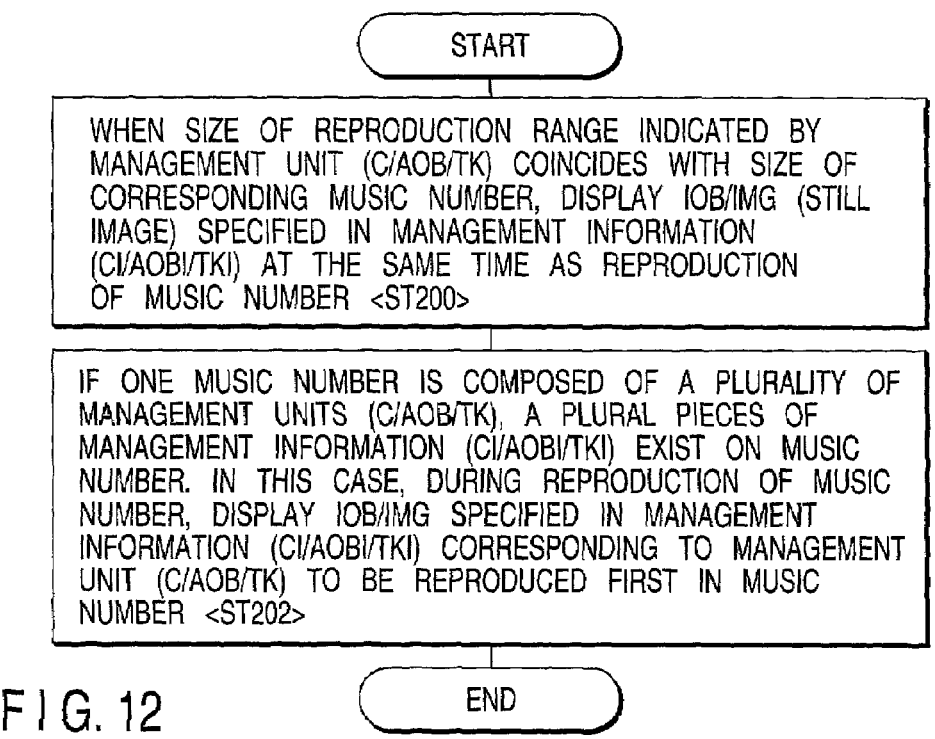
FIG. 12 is a flow chart illustrating how, when audio information is reproduced in units of music numbers from the medium (audio card shown in FIG. 3 or optical disc shown in FIG. 4) having information recorded therein in accordance with the process of FIG. 11, the still image corresponding to that music number is displayed.

FIG. 12 is a flow chart illustrating how the still image corresponding to the music number is displayed, when audio information is reproduced by music number from the medium (audio card shown in FIG. 3 or optical disc shown in FIG. 4) having information recorded according to the steps of FIG. 11. This processing can also be executed by system control section 3020 shown in FIG. 9.

First, the size of the reproduction range indicated by the management unit (C/AOB/TK) is compared with that of the corresponding music number. When these sizes coincide with each other, an image object (IOB/IMG) of the still image specified by image pointer information IPI contained in the management information (CI/AOBI/TKI) is displayed at the same time as reproduction of that music (step ST200).

Here, in the case where one music number (e.g., music number #β shown in (b) of FIG. 6) is composed of a plurality of management units (C/AOB/TK), a plurality of management information (CI/AOBI/TKI) exist in the music number (music number #β).

In this case, an image object (IOB/IMG) of the still image, specified by IPI#2 shown in (c) of FIG. 6, or specified in the management information (CI/AOBI/TKI; for example, AOBI#2 in (c) of FIG. 6) corresponding to the management unit (C/AOB/TK) to be reproduced first in the music number (#β), is displayed while the music number (#β) is reproduced (step ST202).

FIG. 13 is a flow chart illustrating the procedure for edit processing when two music numbers of the audio information with image information recorded in the audio card of FIG. 3 (or the optical disc of FIG. 4) are combined with each other. This procedure can be executed by system control section 3020 shown in FIG. 9, for example.

Now, let us consider a case in which "Combining music" is performed for music number #α and music number #β ((a) of FIG. 1) to produce music number #γ ((c) of FIG. 1), and the audio information (ATS_01.AOB shown in (b) of FIG. 1) corresponding to original music number #α is first reproduced during reproduction of music number #γ.

First, the management unit (C#α/AOB#α/TK# and C#β/AOB#β/TK#β) relating to music number #α and music number #β before "Combining music" and the management information (CI#α/AOBI#α/TKI#α and CI#β/AOBI#β/TKI#β) based on the respective management unit are maintained. Thereafter, the inside of the management information (CI#/AOBI#/TKI#) is changed in correspondence with the combined music number #γ (step ST300).

Due to a change with this music combining (α+β→γ), for example, a part (ATS_01.AOB shown in (d) of FIG. 1) of music number #α is first reproduced during reproduction of music number #γ, and then, another part (ATS_02.AOB shown in (d) of FIG. 1) of music number #β is reproduced.

Next, when the number (4 in the example of (b) of FIG. 1) of still images (IMG_01.IOB to IMG_04.IOB in (b) of FIG. 1) specified by music number #α and music number #β is equal to or less than a predetermined number (for example, 20), the still image specifying information (image pointer information IPI) on the later reproduced music number #β is moved to management information (CI#α, AOBI#α or TK#α; or AOBI#1 exemplified in (c) of FIG. 1) on music number #α to be reproduced first (step ST302).

Figure 14:
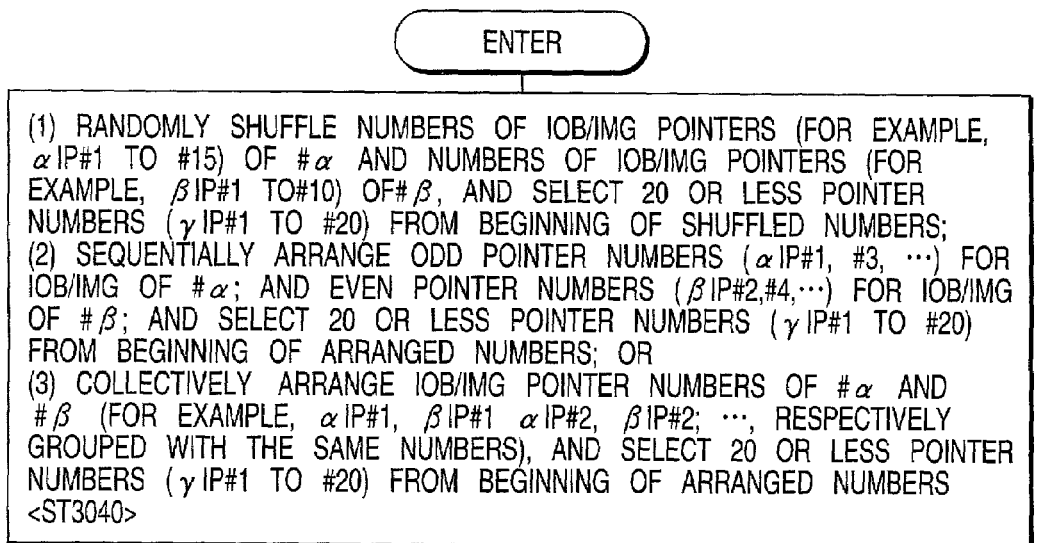
FIG. 14 is a flow chart illustrating a specific example of "automatic selection of still image" to be performed in the step ST304 shown in FIG. 13.

On the other hand, when the number of the still images specified by music number #α and music number #β exceeds the predetermined number (20), (for example, when a total number of the images reaches 25, 15 of which is specified by music number #α and 10 of which is specified by music number #β in (a) of FIG. 2), the predetermined number (20) of still images are automatically selected from among the still images (IMG_01.IOB to IMG_15.IOB in #α+IMG_01.IOB to IMG_10.IOB in #β; not shown) specified by music number #α and music number #β (this automatic selection method will be described later by referring to FIG. 14).

Then, the specifying information (image pointer information IPI for 20 images; or IPI#1' exemplified in (b) of FIG. 2) concerning the selected still image is rewritten in the management information (CI#α/AOBI#α/TKI#α) concerning music number #α, and the specifying information (image pointer information IPI for 5 images; or IPI#2' exemplified in (b) of FIG. 2) concerning the deselected (rejected) still image (25−20=5 images shown in the above example) is rewritten in the management information (CI#β/AOBI#β/TKI#β) concerning music number #β (step ST304).

In this way, the rejected image(s) deselected from the images targeted for display and the management information/specifying information are not actually erased but (as long as the user erases them intentionally) they remain without being displayed. Thus, edit processing for restoring the remaining rejected images to a target of display can be made as required.

In the case where music number #γ combined via the above processing is reproduced, the still image (IOB/IMG) specified in the management information (CI#α/AOBI#α/TKI#α) concerning music number #α (or specified by the IPI pointer) is displayed at the same time as reproduction of music number #γ (step ST306).

After music number #α and music number #β have been combined to form music number #γ, in the case where an attempt is made to display a rejected image(s) deselected from the display targets during reproduction of music number #γ, audio card 100 shown in FIG. 3 (or optical disc 170 shown in FIG. 4) is set to an apparatus having its predetermined edit function (for instance, an advanced recording/reproducing apparatus for audio card or optical disc, or a personal computer installed with a necessary interface and edit program). By means of this edit function, it is possible to replace or exchange the management information (CI#α/AOBI#α/TKI#α) concerning music number #α with the management information (CI#β/AOBI#β/TKI#β) concerning music number #β (step ST308).

Then, the image pointer information (IPI#2' shown in (b) of FIG. 2) for specifying the rejected image(s) becomes the target information for display, so that the rejected image(s) can be displayed during reproduction of music number #γ.

FIG. 14 is a flow chart illustrating a specific example of "automatic selection of still image" to be performed in step ST304 shown in FIG. 13.

Here, assume that 15 still images (IOB/IMG) for music number #α (15 pointers αIP#1 to #15 for specifying the still images) are present; and 10 still images for music number #β (10 pointers βIP#1 to #10 for specifying the still images) are present.

Under this assumption, 20 or less still images (here 20 still images) can be automatically selected from more than 20 still images (here 25 still images) by using any of the methods below (step ST3040).

(1) randomly shuffling the numbers (#1 to #15) of the pointers (αIP#1 to #15) of still images (IOB/IMG) of music number #α and the numbers (# to #10) of pointers (βIP#1 to #10) of still images (IOB/IMG) of music number #β to list them randomly (as a result, a total of 25 pointer numbers is present); and selecting 20 or less pointer numbers (γIP#1 to #20) (here 20 pointers) from the beginning (or from the end); or (2) sequentially arranging the odd pointer numbers (αIP#1, #3, . . . ) of still images (IOB/IMG) of music number #α and the even pointer numbers (βIP#2, #4, . . . ) of still images (IOB/IMG) of music number #β to list in ascending order; and selecting 20 or less pointer numbers (γIP#1 to #20) (here 20 pointers) from the beginning (or from the end); or (3) collectively arranging (or listing) the pointer numbers of still images (IOB/IMG) of music number #α and music number #β in ascending order (for example, α#1, β#1, α#2, β#2, . . . ), and selecting 20 or less (20) pointer numbers (γIP#1 to #20) (here 20 pointers) from the beginning (or from the end).

Incidentally, the still image(s) deselected from the automatic selection of step ST3040 is automatically handled as a rejected image(s).

Figure 15:
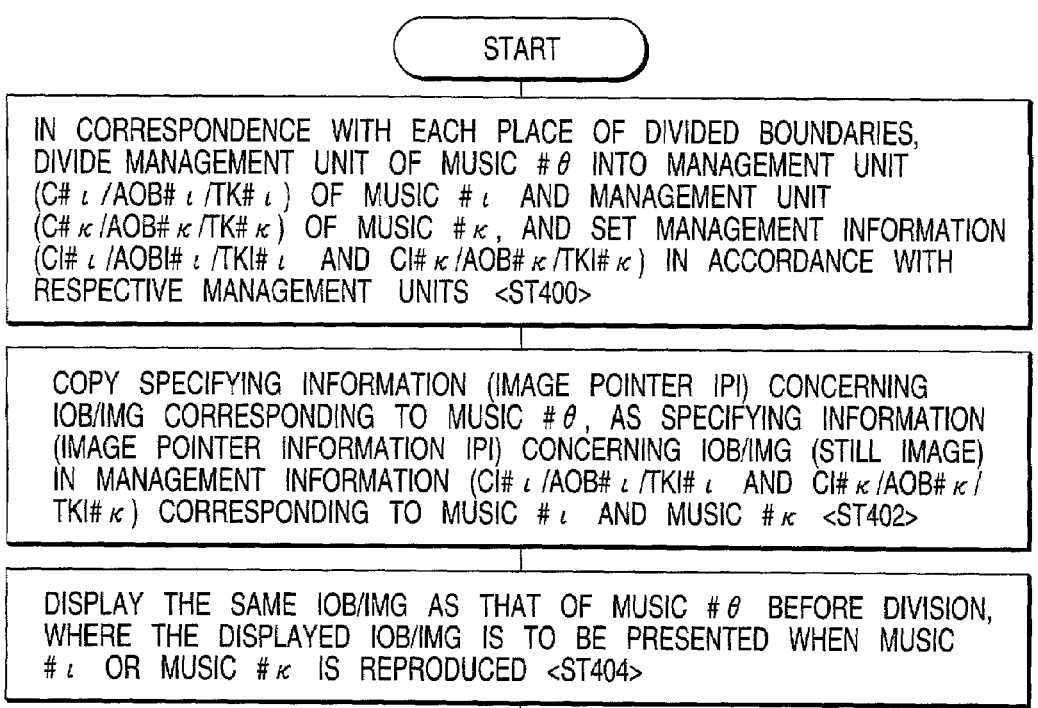
FIG. 15 is a flow chart illustrating the edit processing when one music number of audio information with image information recorded in the audio card shown in FIG. 3 (or optical disc shown in FIG. 4) is divided into two sections.

FIG. 15 is a flow chart illustrating the procedure for edit processing when one music number of the audio information with image information recorded in the audio card shown in FIG. 3 (or optical disc shown in FIG. 4) is divided into two sections. This procedure can be executed by system control section 3020 shown in FIG. 9, for example.

Now assume a case wherein, while music number #θ recorded in card 100 is reproduced by the apparatus shown in FIG. 9, the user desires to divide music number #θ into two sections.

In this case, the user may depress a reproduction pause button (not shown, but provided on a panel of the apparatus shown in FIG. 9) at the time when he or she wishes to divide the music number #θ. Then the user can select the division of music or "dividing music" by the manipulation of an edition dial (not shown, but provided on the panel of the apparatus shown in FIG. 9).

Thereafter, system control section 3020 shown in FIG. 9 divides the management unit (C#θ/AOB#θ/TK#θ) of music number #θ into the management unit (C#ι/AOB#ι/TK#ι) of music number #ι and the management unit (C#κ/AOB#κ/TK#κ) of music number #κ in correspondence with the portion of dividing boundary of music number #θ in the reproduction pause state. Then, the management information (CI#ι/AOBI#ι/TKI#ι and CI#κ/AOBI#κ/TKI#κ) based on the respective management units is newly set (step ST400).

Next, the still image specifying information (IPI#1" shown in (c) of FIG. 2) in the management information (CI#θ/AOBI#θ/TKI#θ) of music number #θ is copied as the still image specifying information (for example, IPI#1" shown in (d) of FIG. 2) in the management information (CI#ι/AOBI#ι/TKI#ι and CI#κ/AOBI#κ/TKI#κ) corresponding to music number #ι and music number #κ (step ST402).

IPI#1" for specifying the display still image of music number #θ is originally within a predetermined number (here "20"). Thus, even if this (IPI#1" within the predetermined number "20") is entirely copied to music number #ι and music number #κ, the number of still images targeted to be displayed by music number #ι and music number #κ is within 20.

As a result, the still image (IOB/IMG) to be displayed when music number #ι or music number #κ is reproduced is the same as the still image (IOB/IMG) displayed when music number #θ before division is reproduced (step ST404).

As exemplified in (c) of FIG. 2, when music number #θ before division has plural pieces of rejected image information, the information (IPI#2', IPI#3', and IPI#4) for specifying the rejected images is properly distributed to the divided music number #ι and music number #κ (refer to (d) of FIG. 2).

Figure 16:
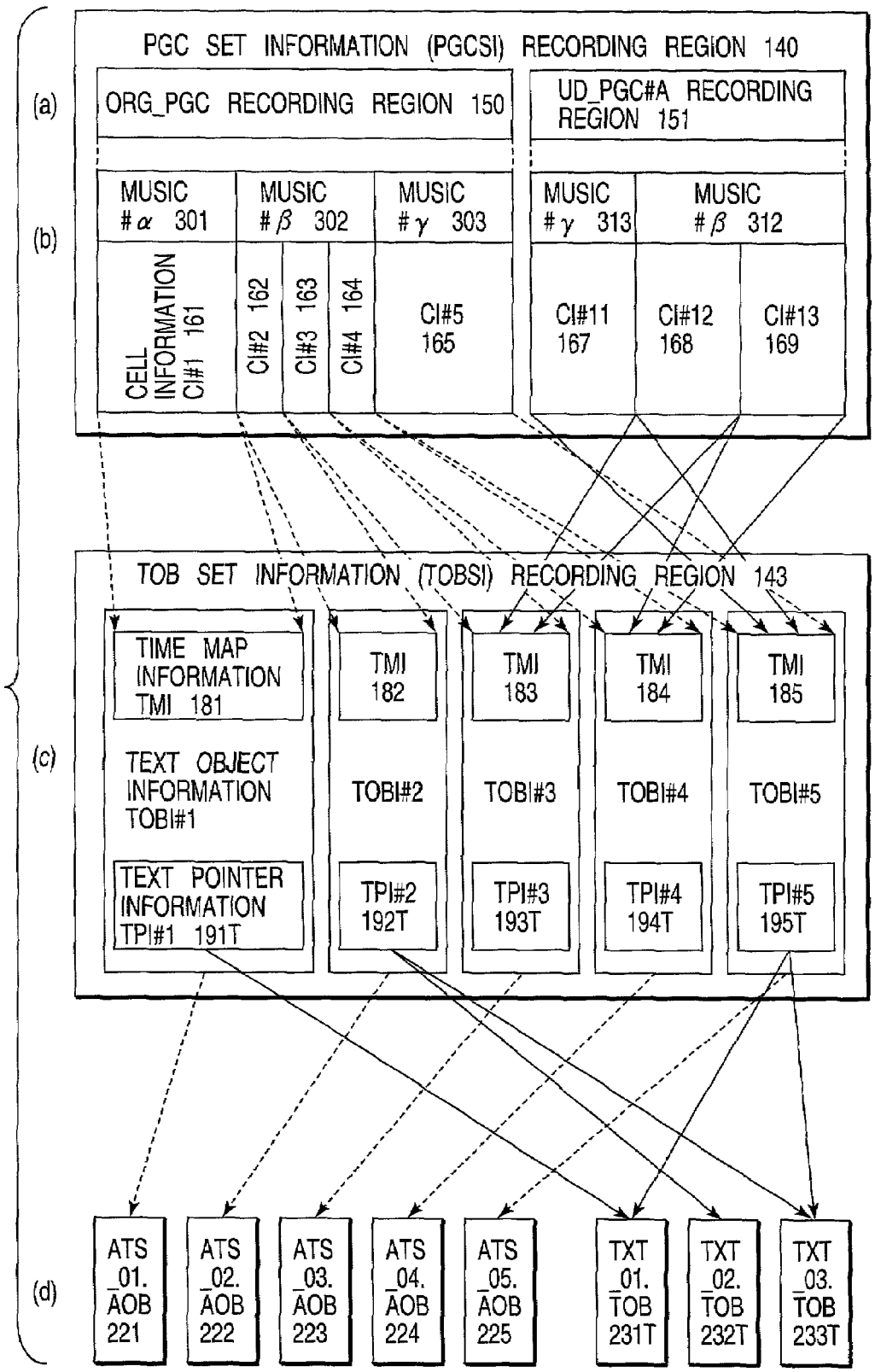
FIG. 16 is a view illustrating an example of a reproduction relationship (the arrows shown in the figure) between a plurality of music numbers stored in the information storage medium shown in FIG. 3 or FIG. 4 and text (characters, signs, graphics and/or marks) accompanying these music numbers.

FIG. 16 is a view illustrating an example of a reproduction relationship (the arrows shown in the figure) between a plurality of music numbers stored in the information storage medium shown in FIG. 3 or FIG. 4 and text (characters, signs, graphics and/or marks) accompanied with these music numbers.

In FIG. 16, there is shown an example of how text information displayed simultaneously during music reproduction is managed, wherein audio object information AOBI# and image pointer information IPI# shown in FIG. 6 are respectively replaced with text object information TOBI# and text pointer information TPI#.

Figure 19:
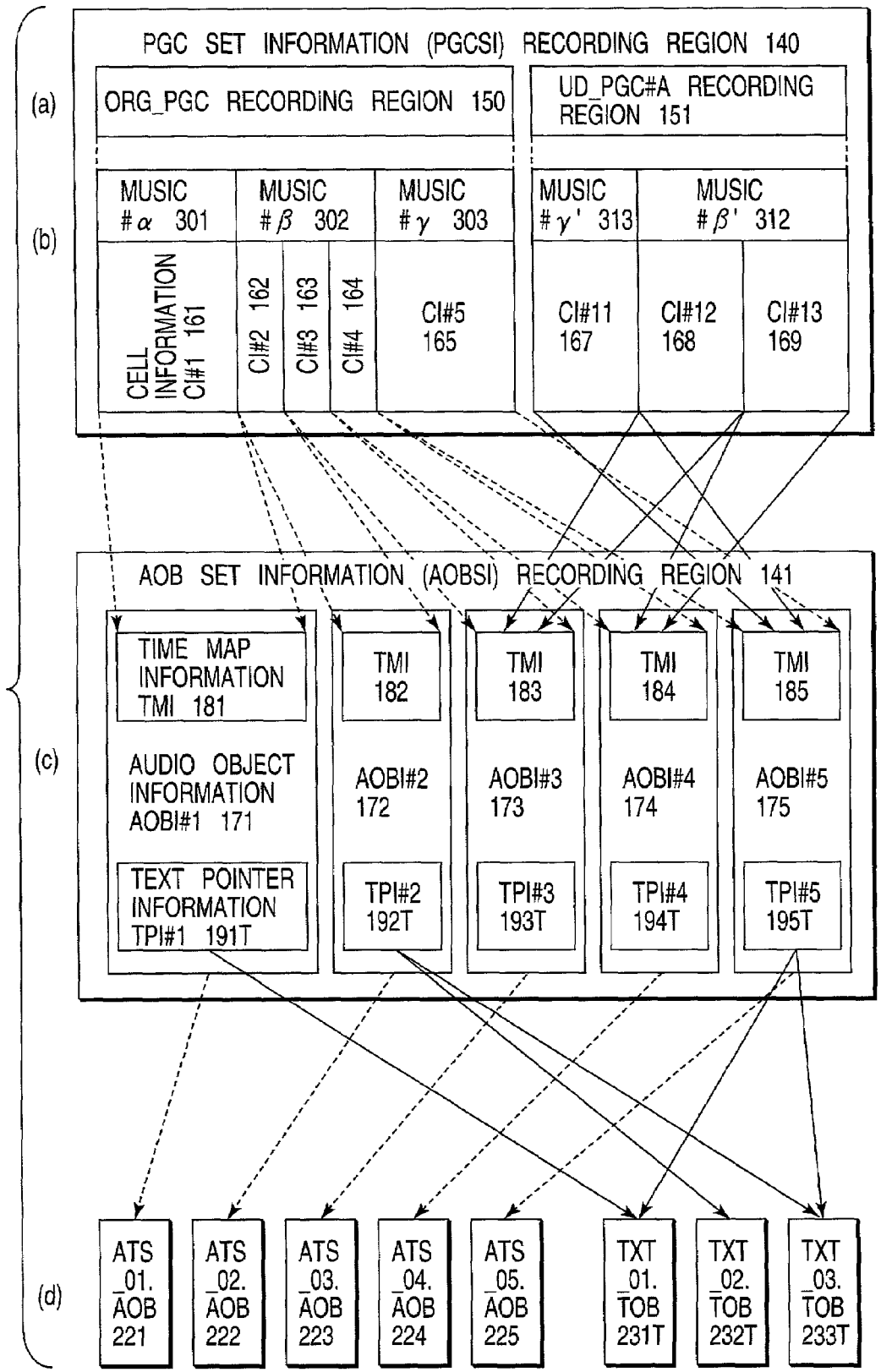
FIG. 19 is a view illustrating still another example of a reproduction relationship (the arrows shown in the figure) between a plurality of music numbers stored in the information storage medium shown in FIG. 3 or FIG. 4 and text (characters, signs, graphics and/or marks) accompanying these music numbers.

FIG. 19 is a view illustrating another example of a reproduction relationship (the arrows in the figure) between a plurality of music numbers stored in the information storage medium shown in FIG. 3 or FIG. 4 and text (characters, signs, graphics and/or marks) accompanied with these music numbers.

FIG. 19 shows another example of how text information displayed simultaneously during music reproduction is managed, wherein image pointer information IPI# shown in FIG. 6 is replaced with text pointer information TPI#.

Figure 17:
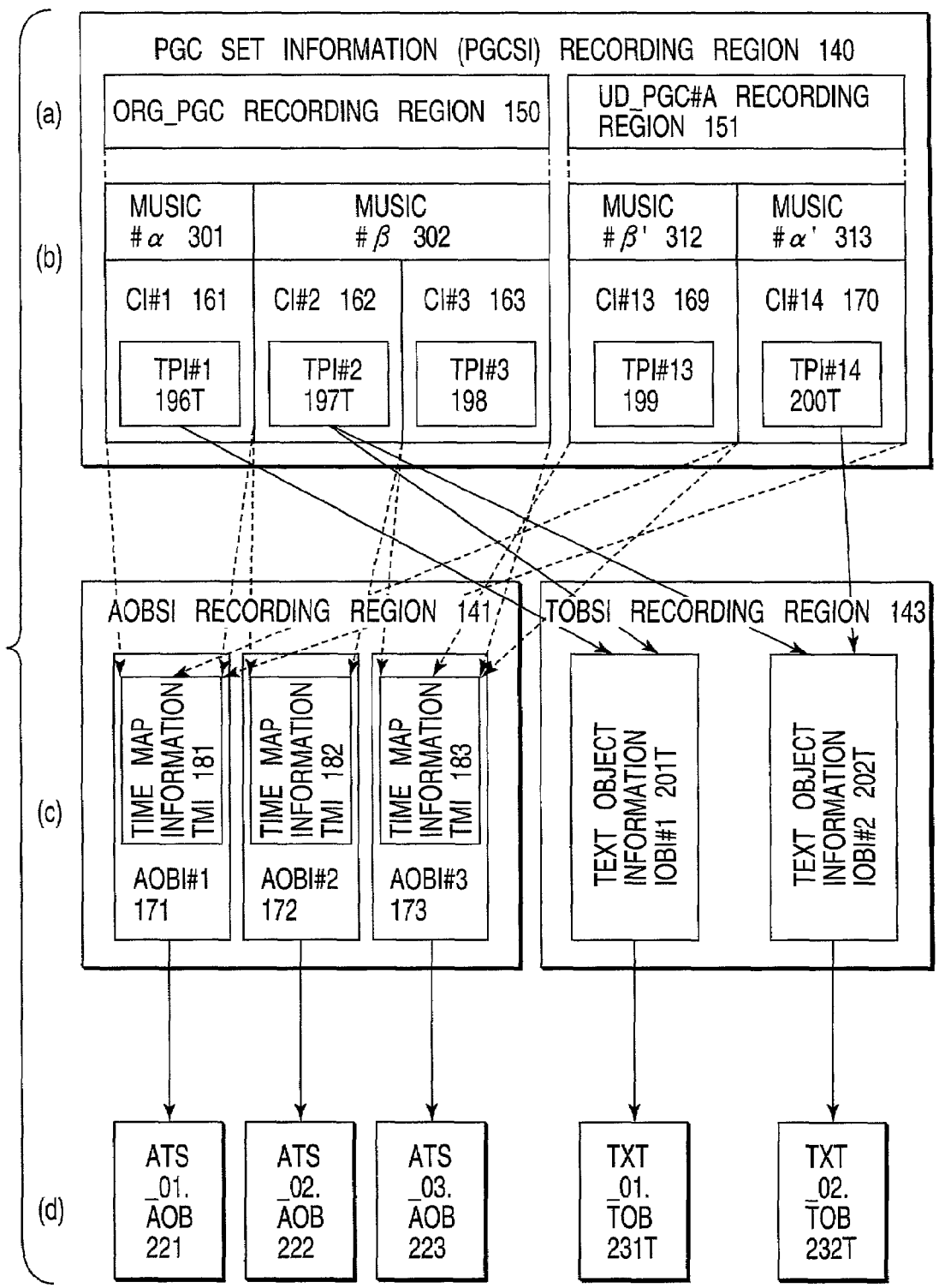
FIG. 17 is a view illustrating another example of a reproduction relationship (the arrows shown in the figure) between a plurality of music numbers stored in the information storage medium shown in FIG. 3 or FIG. 4 and text (characters, signs, graphics and/or marks) accompanying these music numbers.

FIG. 17 is a view illustrating still another example of a reproduction relationship (the arrows shown in the figure) between a plurality of music numbers stored in the information storage medium shown in FIG. 3 or FIG. 4 and text (characters, signs, graphics, and/or marks) accompanied with these music numbers.

FIG. 17 shows still another example of how text information displayed simultaneously during music reproduction is managed, wherein image object information IOBI# shown in FIG. 7 is replaced with text object information TOBI#.

Figure 18:
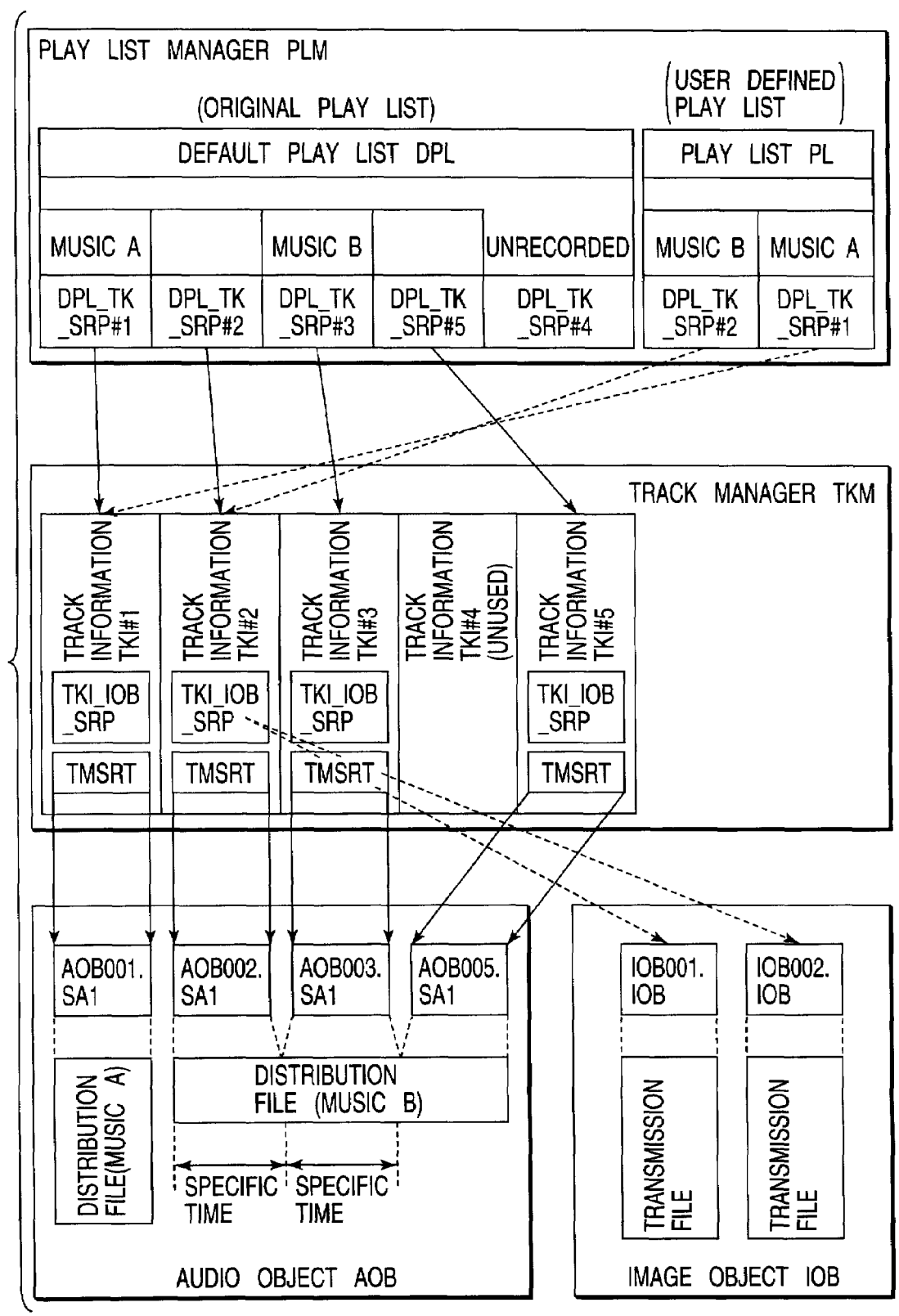
FIG. 18 is a view illustrating a reproduction relationship (the arrows with dashed line shown in the figure) between a plurality of music numbers and still images accompanying these music numbers in a case wherein cell information (CI#) shown in FIG. 6 is reread to a track search pointer (DPL_TK_SRP#), audio object information (AOBI#) shown in FIG. 6 is reread to track information (TKI#), and image pointer information (IPI#) shown in FIG. 6 is reread as track information search pointer (TKI_IOB_SRP) for the image object.

FIG. 18 is a view illustrating a reproduction relationship (dashed line arrows shown in the figure) between a plurality of music numbers and still images accompanied with these music numbers, provided that the cell information (CI#) shown in FIG. 6 is reread to the track search pointer (DPL_TK_SRP#); the audio object information (AOBI#) shown in FIG. 6 is reread to track information (TKI#); and the image pointer information (IPI#) shown in FIG. 6 is reread to the track information search pointer (TKI_IOB_SRP) for the image object.

The information reproduction relationship described with reference to FIG. 6 or FIG. 7 can be applied to FIG. 18 by rereading the following terms (replacement on interpretation of terms):

PGC set information→play list manager PLM;
Original PGC→default play list DPL;
Individual user defined PGC—individual play list PL;
Cell information CI→track search pointer DPL_TK_SRP of the default play list;
Audio object information AOBI→track information TKI;
Cell information CI→track information TKI;
Image pointer information IPI→track information image object search pointer TKI_IOB_SRP; and
Time map information TMI time search table TMSRT.

In the configuration shown in FIG. 18, if the playing time of music number #B is long, the AOB file of such long music number #B may be automatically divided by given specific time intervals, and track information TKI (corresponding to AOBI or CI) may be assigned to each divided AOB file.

In the above case, the divided AOB file number is made coincident with the assigned TKI number.

Only the head TKI (or the leading TKI) of each music number is specified from individual play list PL defined by the user, not from default play list DPL. In this case, the still image(s) to be displayed in unit of the music number is (are) specified by the head TKI of each music number.

In the example shown in FIG. 18, an unrecorded area or unused area is provided for the contents of default play list DPL or those of track manager TKM (management information).

When an unrecorded area (unused area) can thus be set in management information, even if part of the management information is deleted by editing or the like, the handling of the management information can be simplified because the other part of the management information can be maintained intact.

Further, since the size of each TKM (management information) including the unused area is fixed to, for example, 1536 bytes, the management of the recording position (address) of each TKM (management information) can be simplified.

In view of this fact, the buffer memory size of the reproduction apparatus side required for the management information (or the size of a buffer (not shown) incorporated in, for example, information recording and reproducing section 3000 of the apparatus shown in FIG. 9) can be saved significantly.

Advantages obtained by preferred embodiments of the present invention described hereinbefore can be summarized as follows.

1. According to an embodiment of the present invention, edit processing such as combining and/or dividing music can be performed simply and quickly for audio information with still image (or audio information that can be reproduced together with still image(s)/still picture(s)) without materially changing management information.

2. Still image(s) to be displayed when audio information is reproduced in unit of music number can be easily set during edit processing such as combining and/or dividing music.

3. Even after combining music, the reproduction range of music before being combined is left as "management unit (cell/AOB/track)" indicative of the reproduction range in audio information (AOB), and the management information (CI/AOBI/TKI) concerning the management unit is recorded as management information on the information storage medium. Thus, changes in the management information before and after combining music become small, and control during editing is simplified.

4. When one music number is composed of a plurality of "management units (cell/AOB/track)" by combining music or the like, specifying information, concerning the still image information described in the management information (CI/AOBI/TKI) which is related to the management unit to be reproduced first in the music, is indicative of the still image information displayed when the entire music is reproduced, and thus, the memory size of the reproduction apparatus can be reduced.

At this time, when the specifying information for still image information displayed during reproduction in unit of music number has been recorded in management information concerning the management unit reproduced in the latter half of the music, then the management information concerning all management units configuring the music is temporarily stored in a memory of the reproduction apparatus before reproducing the music.

5. The information for specifying the still image information (IOB) out of the display target range after combining music is recorded in management information (CI/AOBI/TKI) concerning management unit (cell/AOB/track) displayed in second and subsequent part of the same music number. Then, (by use of a highly advanced machine, for example,) a user can select and change later the still image information (IOB) targeted for display by music number (or in unit of music number).

6. After dividing music, the specifying information for the still image information (IOB) before division is entirely copied and stored, so that the user can feel comfort that the still image information displayable after division is maintained without being altered.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A method for editing audio information with a still image using an information storage medium in which audio information and still image information are recorded, and management information indicative of a reproduction relationship between said audio information and said still image information is recorded, wherein said medium comprises a first reproduction unit for reproducing said audio information, first management information specifying still image information to be reproduced simultaneously when first audio information is reproduced in said first reproduction unit, and second management information specifying still image information reproduced simultaneously when second audio information different from said first audio information is reproduced in said first reproduction unit, said method comprising:

combining said first audio information and said second audio information with each other to produce third audio information that newly forms said first reproduction unit;

recording third management information corresponding to said third audio information on said information storage medium; and including, in still image information specified in said third management information, all or at least part of still image information specified in said first management information, and including therein all or at least part of still image information specified in said second management information, and wherein in a case where said first audio information is reproduced earlier than said second audio information in said third audio information, a recording place for said third management information is utilized to be compatible with a recording place for said first management information;

in a case where a summation of the still image information specified in said first management information and the still image information specified in said second management information exceeds a predetermined value, a total number of the still image information specified in said third management information is reduced to the predetermined value so that a reduced number of the still image information remains, and information specifying the reduced number of remaining still image information is recorded at a portion corresponding to the first management information of said third management information; and information specifying still image information other than the still image information specified in said third management information is recorded at a portion corresponding to the second management information of said third management information.

* * * * *